(12) United States Patent
Ichikawa

(10) Patent No.: US 8,053,921 B2
(45) Date of Patent: *Nov. 8, 2011

(54) DRIVING FORCE GENERATION SYSTEM, VEHICLE USING THE SYSTEM, AND METHOD FOR CONTROLLING THE SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 189 days.

This patent is subject to a terminal disclaimer.

(21) Appl. No.: 12/312,873

(22) PCT Filed: Feb. 12, 2008

(86) PCT No.: PCT/JP2008/052609
§ 371 (c)(1),
(2), (4) Date: May 29, 2009

(87) PCT Pub. No.: WO2008/099953
PCT Pub. Date: Aug. 21, 2008

(65) Prior Publication Data
US 2010/0065351 A1  Mar. 18, 2010

(30) Foreign Application Priority Data
Feb. 13, 2007 (JP) .................................. 2007-032114

(51) Int. Cl.
*B60L 1/00* (2006.01)

(52) U.S. Cl. ........................................................ 307/9.1
(58) Field of Classification Search .................... 307/9.1
See application file for complete search history.

(56) References Cited

U.S. PATENT DOCUMENTS

| 6,043,629 | A | 3/2000 | Ashley et al. |
| 6,608,396 | B2 | 8/2003 | Downer et al. |
| 7,847,432 | B2* | 12/2010 | Ichikawa ........................ 307/45 |
| 2003/0107352 | A1 | 6/2003 | Downer et al. |
| 2005/0263333 | A1 | 12/2005 | Fujiki |

FOREIGN PATENT DOCUMENTS

| JP | A-2000-116014 | 4/2000 |
| JP | A-2002-010502 | 1/2002 |
| JP | A-2003-209969 | 7/2003 |
| JP | A-2005-218250 | 8/2005 |
| JP | A-2005-348482 | 12/2005 |
| JP | A-2008-60047 | 3/2008 |

* cited by examiner

*Primary Examiner* — Robert L. Devberadinis
(74) *Attorney, Agent, or Firm* — Oliff & Berridge, PLC

(57) ABSTRACT

A target power value determining unit determines target power values Pc1* and Pc2* such that a sum SPc* of target load powers as a sum of target load power Pc1* and target load power Pc2* does not exceed a sum SWin of allowable charging powers and a sum SWout of allowable discharging powers. In accordance with the generated target load power values Pc1* and Pc2*, switching commands PWM1 and PWM2 are generated. Consequently, an inverter executes a power conversion operation such that the powers exchanged between a main line ML and motor generators attain to the target load power values Pc1* and Pc2*, respectively.

13 Claims, 13 Drawing Sheets

DRIVING FORCE GENERATION SYSTEM, VEHICLE USING THE SYSTEM, AND METHOD FOR CONTROLLING THE SYSTEM

TECHNICAL FIELD

The present invention relates to a driving force generation system having a plurality of power storage units, a vehicle provided with the system, and to a method of controlling the system. Particularly, the present invention relates to a power management technique for the overall system.

BACKGROUND ART

Recently, in consideration of environmental issues, vehicles using electric motors as driving sources, such as electric vehicles, hybrid vehicles and fuel cell vehicles are attracting attention. Such a vehicle is provided with a rechargeable power storage unit for supplying power to the electric motor and for converting kinetic energy to electric energy and storing the same at the time of regenerative braking.

In the vehicle having an electric motor as the driving source as described above, power supply of larger capacity is desirable in order to improve running performance such as acceleration characteristic and mileage per charge. As a method of increasing power supply capacity, provision of a plurality of power storage units has been proposed.

By way of example, U.S. Pat. No. 6,608,396 discloses an electrical motor power management system providing a desired high DC voltage level in a high-voltage vehicle traction system. The electrical motor power managements system includes: a plurality of power stages for providing DC power to at least one inverter, each stage including a battery and boost/buck DC-DC converter, and wired in parallel; and a controller controlling the plurality of power stages such that the batteries of the plurality of power stages are uniformly charged/discharged whereby the battery voltage to the at least one inverter is maintained by the plurality of power stages.

The power storage unit storing electric energy utilizing electro-chemical reaction has a maximum allowable power that can be charged and discharged (hereinafter referred to as the allowable power) defined in accordance with its state of charge. The allowable power represents a limit value for protecting each electric storage unit against excessive degradation.

On the other hand, in determining a driving force required in accordance with the state of running of the vehicle, the allowable power as such is not considered, and main focus has been on the optimization among the plurality of power storage units for sharing the driving force determined in accordance with the state of running. For instance, in the electrical motor power managements system of U.S. Pat. No. 6,608,396 mentioned above, what is disclosed is only a structure for actively distributing predetermined load power source as a whole.

Therefore, if a target value of driving force is set exceeding the allowable range of power supply or power regeneration of the plurality of power storage units as a whole, excessive degradation possibly occurs in each of the power storage units, or drivability (driving characteristic) possibly lowers.

DISCLOSURE OF THE INVENTION

The present invention was made to solve such a problem, and its object is to provide a driving force generation system enabling power management of the system as a whole, a vehicle provided with the system, and a method of controlling the same.

According to an aspect, the present invention provides a driving force generation system, including: a power line; a plurality of power storage units connected in parallel with the power line; a rotating electric machine capable of bi-directionally converting electric power and rotational driving force; a power converting unit connected between the power line and the rotating electric machine, for performing power conversion between the rotating electric machine and the power line; allowable power determining means for determining allowable power of charging or discharging in each of the plurality of power storage units, based on state of charge of each of the plurality of power storage units; and target power value determining means for determining, within a range of a sum of allowable powers obtained by summing up the allowable power of each of the power storage units, a target power value to be exchanged between the power line and the rotating electric machine, in accordance with a state of running; wherein the power converting unit is configured to execute a power converting operation such that the power exchanged between the power line and the rotating electric machine attains to the target power value.

Preferably, the driving force generation system further includes a plurality of voltage converting units each arranged between the power line and corresponding one of the plurality of power storage units. Any one of the plurality of power converting units executes the voltage converting operation in accordance with a first control mode to have a voltage of the power line attain to a prescribed target voltage value. Each of remaining one(s) of the plurality of voltage converting units executes the voltage converting operation in accordance with a second control mode to have a power exchanged between the power line and corresponding power storage unit attain a corresponding target shared power value.

More preferably, the driving force generation system further includes distributing means for determining the target shared power value for each of the remaining one(s) of the plurality of power storage units in accordance with the target power value, such that power to be shared by each of the plurality of power storage units does not exceed the corresponding allowable power.

Preferably, the driving force generation system further includes a single voltage converting unit arranged between the power line and the plurality of power storage units, and the target power value determining means determines the target power value such that it does not exceed a value obtained by multiplying the sum of allowable powers by a uniform share ratio in accordance with internal resistance values of the plurality of power storage units.

More preferably, the uniform share ratio is determined dependent on state of charge of the plurality of power storage units.

Alternatively, or more preferably, the uniform share ratio is determined dependent on temperature of the plurality of power storage units.

Preferably, the voltage converting unit executes the voltage converting operation in accordance with a control mode to have a voltage of the power line attain a prescribed target voltage value.

Preferably, the driving force generation system includes a plurality of rotational electric machines and a plurality of power converting units corresponding to the plurality of rotating electric machines, respectively. Each of the plurality of power converting units executes the power converting operation such that a sum of powers exchanged between the power line and the plurality of rotating electric machines attains to the target power value.

According to another aspect, the present invention provides a driving force generation system, including: a power line; a plurality of power storage units connected in parallel with the power line; a rotating electric machine capable of bi-directionally converting electric power and rotational driving force; a power converting unit connected between the power line and the rotating electric machine, for performing power conversion between the rotating electric machine and the power line; and a controller. The controller is configured to determine allowable power of charging or discharging in each of the plurality of power storage units, based on state of charge of each of the plurality of power storage units, and to determine, within a range of a sum of allowable powers obtained by summing up the allowable power of each of the power storage units, a target power value to be exchanged between the power line and the rotating electric machine, in accordance with a state of running; and the power converting unit is configured to execute a power converting operation such that the power exchanged between the power line and the rotating electric machine attains to the target power value.

According to a still another aspect, the present invention provides a driving force generation system, including: a power line; a plurality of power storage units; a plurality of voltage converting units connected in parallel with the power line and in correspondence with the plurality of power storage units, respectively; a plurality of rotating electric machines capable of bi-directionally converting electric power and rotational driving force; a plurality of power converting units connected in parallel with the power line and in correspondence with the plurality of rotating electric machines, respectively; and a controller. The controller is configured to individually generate a command for each of the plurality of voltage converting units to be within a range of allowable power of charging or discharging that is determined based on state of charge of each of the plurality of power storage units and to individually generates a command for each of the plurality of power converting units to be within a range of a sum of allowable powers that is obtained by summing up the allowable power of each of the plurality of power storage units.

According to a further aspect, the present invention provides a vehicle provided with a driving force generation system. The driving force generation system includes: a power line; a plurality of power storage units connected in parallel with the power line; a rotating electric machine capable of bi-directionally converting electric power and rotational driving force; a power converting unit connected between the power line and the rotating electric machine, for performing power conversion between the rotating electric machine and the power line; allowable power determining means for determining allowable power of charging or discharging in each of the plurality of power storage units, based on state of charge of each of the plurality of power storage units; and target power value determining means for determining, within a range of a sum of allowable powers obtained by summing up the allowable power of each of the power storage units, a target power value to be exchanged between the power line and the rotating electric machine, in accordance with a state of running. The power converting unit is configured to execute a power converting operation such that the power exchanged between the power line and the rotating electric machine attains to the target power value.

According to a still further aspect, the present invention provides a method of controlling a driving force generation system. The driving force generation system includes: a power line, a plurality of power storage units electrically connected in parallel with the power line, a rotating electric machine capable of bi-directionally converting electric power and rotational driving force, and a power converting unit connected between the power line and the rotating electric machine, for performing power conversion between the rotating electric machine and the power line. The control method includes the steps of: determining allowable power of charging or discharging in each of the plurality of power storage units, based on state of charge of each of the plurality of power storage units; determining, within a range of a sum of allowable powers obtained by summing up the allowable power of each of the power storage units, a target power value to be exchanged between the power line and the rotating electric machine, in accordance with a state of running; and controlling a power converting operation at the power converting unit such that the power exchanged between the power line and the rotating electric machine attains to the target power value.

According to a still further aspect, the present invention provides a method of controlling a driving force generation system. The driving force generation system includes a power line, a plurality of power storage units, a plurality of voltage converting units connected in parallel with the power line and in correspondence with the plurality of power storage units, respectively, a plurality of rotating electric machines capable of bi-directionally converting electric power and rotational driving force, and a plurality of power converting units connected in parallel with the power line and in correspondence with the plurality of rotating electric machines, respectively. The control method includes the steps of: determining allowable power of charging or discharging in each of the power storage units, based on state of charge of each of the plurality of power storage units; determining a sum of allowable powers by summing up the allowable power of each of the plurality of power storage units; individually generating a command for each of the plurality of voltage converting units to be within a range of allowable power of each of the power storage units; and individually generating a command for each of the plurality of power converting units to be within a range of the sum of allowable powers.

By the present invention, a driving force generation system enabling power management of the system as a whole, a vehicle provided with the system, and a method of controlling the same can be provided.

BEST MODES FOR CARRYING OUT THE INVENTION

Figure 1:
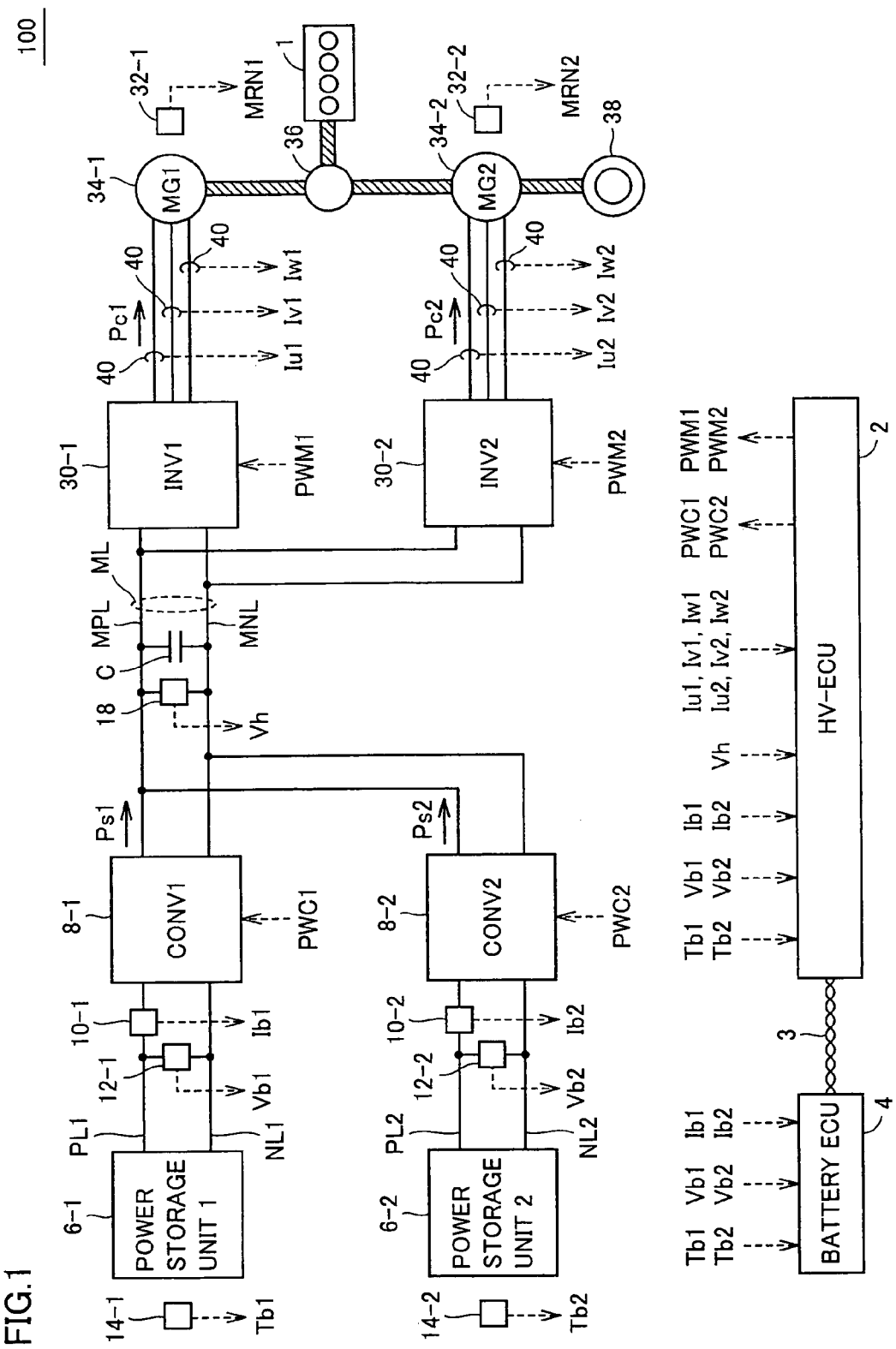
FIG. 1 is a schematic diagram representing a substantial portion of a vehicle provided with the driving force generation system in accordance with Embodiment 1 of the present invention.

Embodiments of the present invention will be described in detail with reference to the figures. In the figures, the same or corresponding portions are denoted by the same reference characters and description thereof will not be repeated.

Embodiment 1

FIG. 1 is a schematic diagram representing a substantial portion of a vehicle 100 provided with the driving force generation system in accordance with Embodiment 1 of the present invention.

Referring to FIG. 1, vehicle 100 is, by way of example, a hybrid vehicle using, as driving sources, an engine 1 operating on fuel combustion and a driving force generation system in accordance with the present embodiment, and runs as the generated driving force is transmitted to driving wheels 38. The usage of the driving force generation system in accordance with the present invention is not limited to a hybrid vehicle and it is also applicable to an electric vehicle (EV) not mounting an engine.

Driving force generation system includes a first power storage unit 6-1, a second power storage unit 6-2, a first converter (CONV1) 8-1, a second converter (CONV2) 8-2, a first inverter (INV1) 30-1, a second inverter (INV2) 30-2, a first motor generator (MG1) 34-1, a second motor generator (MG2) 34-2, an HV-ECU 2, and a battery ECU 4.

Power storage units 6-1 and 6-2 are rechargeable elements for storing DC power and, by way of example, implemented by a secondary battery such as a nickel hydride battery or a lithium ion battery, or an electric double layer capacitor. Power storage units 6-1 and 6-2 are electrically connected in parallel, to a main positive line MPL and a main negative line MNL, through converters 8-1 and 8-2, respectively. Here, the main positive line MPL and main negative line MNL correspond to the "power line" of the present invention, and in the following, they may be generally referred to as a "main line ML."

Converters 8-1 and 8-2 are voltage converting units arranged between corresponding power storage units 6-1 and 6-2 and the main line ML, for performing a voltage converting operation therebetween. Specifically, converters 8-1 and 8-2 are capable of boosting power discharged from power storage unit 6-1 and 6-2, respectively, and supplying the boosted result to main line ML, and capable of lowering regenerative power supplied from main line ML and supplying the result to power storage units 6-1 and 6-2, respectively. The voltage converting operation as such is controlled by switching commands PWC1 and PWC2 from HV-ECU 2, as will be described later. Further, converters 8-1 and 8-2 are formed, for example, by a "chopper" type voltage boosting/lowering circuit.

The first power storage unit 6-1 is electrically connected to the first converter 8-1 through a positive line PL1 and a negative line NL1. A current detecting unit 10-1 inserted to positive line PL1 detects a current value Ib1 exchanged between first power storage unit 6-1 and first converter 8-1, and a voltage detecting unit 12-1 connected between positive line PL1 and negative line NL1 detects a voltage value Vb1 related to charge or discharge of first power storage unit 6-1. Further, a temperature detecting unit 14-1 is arranged adjacent to a battery cell forming the first power storage unit 6-1, and it detects a temperature Tb1 of the first power storage unit 6-1. Temperature detecting unit 14-1 may be adapted to output a representative value of values detected by a plurality of detecting elements arranged corresponding to a plurality of battery cells forming the first power storage unit 6-1.

Similarly, the second power storage unit 6-2 is electrically connected to the second converter 8-2 through a positive line PL2 and a negative line NL2. A current detecting unit 10-2 is inserted to positive line PL2 and a voltage detecting unit 12-2 is connected between positive line PL2 and negative line NL2. Further, a temperature detecting unit 14-2 is arranged adjacent to a battery cell forming the second power storage unit 6-2. Current detecting unit 10-2, voltage detecting unit 12-2 and temperature detecting unit 14-2 detect current value Ib2, voltage value Vb2 and temperature Tb2, respectively.

Here, powers flowing through converters 8-1 and 8-2 will be denoted as supply powers Ps1 and Ps2, respectively. Supply powers Ps1 and Ps2 each flow in both directions and, here, the flow from storage units 6-1 or 6-2 to the main line ML is defined to be "positive."

To the other end of main line ML, inverters 30-1 and 30-2 are electrically connected in parallel. Inverters 30-1 and 30-2 are electrically connected to motor generators 34-1 and 34-2, respectively, and perform power conversion with main line ML. Specifically, inverters 30-1 and 30-2 control power exchanged between main line ML and motor generators 34-1 and 34-2, respectively. Specifically, inverters 30-1 and 30-2 are capable of converting DC power supplied through main line ML to AC power and supplying it to motor generators 34-1 and 34-2, respectively, and capable of converting AC power generated by motor generators 34-1 and 34-2 to DC power and returning it to main line ML. The power converting operation as such is controlled by switching commands PWM1 and PWM2 from HV-ECU 2, respectively, as will be described later. Further, inverters 30-1 and 30-2 are formed, for example, of bridge circuits including three-phase arms, and provide power conversion by switching operations (circuit opening/closing operations) in response to switching commands PWM1 and PWM2.

Motor generators 34-1 and 34-2 are rotating electric machines capable of bi-directionally converting electric power to/from rotational driving force, capable of generating rotational driving force from AC power that is supplied from inverters 30-1 and 30-2, respectively, and capable of generating electric power (power generation) receiving external rotational driving force that is derived from kinetic energy of engine 1 or vehicle 100. By way of example, motor generators 34-1 and 34-1 are three-phase AC rotating electric machines having a rotor with embedded permanent magnet. Further, to each of power lines corresponding to three phases connecting inverter 30-1 and motor generator 34-1, a current detecting unit 40 is provided, for detecting respective phase current values Iu1, Iv1 and Iw1. Similarly, to each of power lines corresponding to three phases connecting inverter 30-2 and motor generator 34-2, a current detecting unit 40 is provided, for detecting respective phase current values Iu2, Iv2 and Iw2. Further, on rotation shafts of motor generators 34-1 and 34-2, rotational speed detecting units 32-1 and 32-2 are provided, for detecting rotational speed MRN1 and MRN2 of respective motor generators.

Motor generators 34-1 and 34-2 are mechanically coupled to engine 1, by means of a power split device 36. By way of example, power split device 36 is formed of a planetary gear mechanism including three elements of a sun gear, a carrier and a ring gear, and it combines and/or distributes driving forces generated by engine 1 and motor generators 34-1 and 34-2 and then transmits the result to driving shaft 38.

In vehicle 100 as a hybrid vehicle, in order to optimize general fuel consumption efficiency, driving forces generated by engine 1 and motor generators 34-1 and 34-2 are determined based on the signals from various sensors, state of running, accelerator position (all not shown) and the like. Motor generators 34-1 and 34-2 are capable of bi-directionally converting electric power and rotational driving force, that is, capable of operating as a "motor (electric motor)" or a "generator (power generator)". Therefore, the determined driving force is in the positive range (power running side) or negative range (regenerative side). If a "positive" driving force is set as the target value, the inverter controls such that AC power is supplied from main line ML to the corresponding motor generator, and if a "negative" driving force is set as the target value, the inverter controls such that AC power generated by the corresponding motor generator is regenerated to the main line ML.

Here, the powers flowing through inverters 30-1 and 30-2 will be referred to as load powers Pc1 and Pc2, respectively. Load powers Pc1 and Pc2 each may flow in both directions and, therefore, here, the flow from main line ML to motor generators 34-1 or 34-2 will be defined as "positive."

In vehicle 100 in accordance with Embodiment 1, the first motor generator 34-1 may function solely as a generator, and the second motor generator 34-2 may function solely as an electric motor.

Between main positive line MPL and main negative line MNL, a smoothing capacitor C is connected, which reduces fluctuating component included in the electric power exchanged through the main line ML. Further, between main positive line MPL and main negative line MNL, a voltage detecting unit 18 is connected, for detecting a voltage value Vh appearing between main positive line MPL and main negative line MNL.

The driving force generation system described above is controlled by coordinated operations of HV-ECU 2 and battery ECU 4 connected to each other by a control line 3.

Battery ECU 4 is a controller mainly managing state of charge and charge/discharge control of power storage units 6-1 and 6-2, and, by way of example, it is formed using, as a main body, a micro-computer including a CPU (Central Processing Unit), and a storage such as an ROM (Read Only Memory) and an RAM (Random Access Memory). Specifically, battery ECU 4 calculates state of charge (SOC) of power storage units 6-1 and 6-2, based on temperatures Tb1 and Tb2 from temperature detecting units 14-1 and 14-2, voltage values Vb1 and Vb2 from voltage detecting units 12-1 and 12-2, and current values Ib1 and Ib2 from current detecting units 10-1 and 10-2. The state of charge (SOC) represents the amount of charge using the fully charged state of the power storage unit as a reference and, by way of example, it is represented by a ratio (0 to 100%) of the current amount of charge with respect to the full charge capacity.

Further, battery ECU 4 determines, based on the calculated SOCs of power storage units 6-1 and 6-2, allowable charging power Win and allowable discharging power Wout of power storage units 6-1 and 6-2. Allowable charging power Win and allowable discharging power Wout represent allowable power values (limit values) that can be charged and discharged, respectively, without degrading the power storage units, considering the electro-chemical reaction at the power storage units. Allowable charging power Win and allowable discharging power Wout are determined dependent on the SOC, temperature and the like of the power storage unit.

In the following, when simply denoted as "SOC", it generally means "state of charge", and when simply denoted as "Win" and "Wout", they generally mean the "allowable charging power" and the "allowable discharging power", respectively. If a suffix ("1" or "2") is added to "SOC", "Win" or "Wout", it represents a specific value in the power storage unit 6-1 or 6-2.

Figure 2:
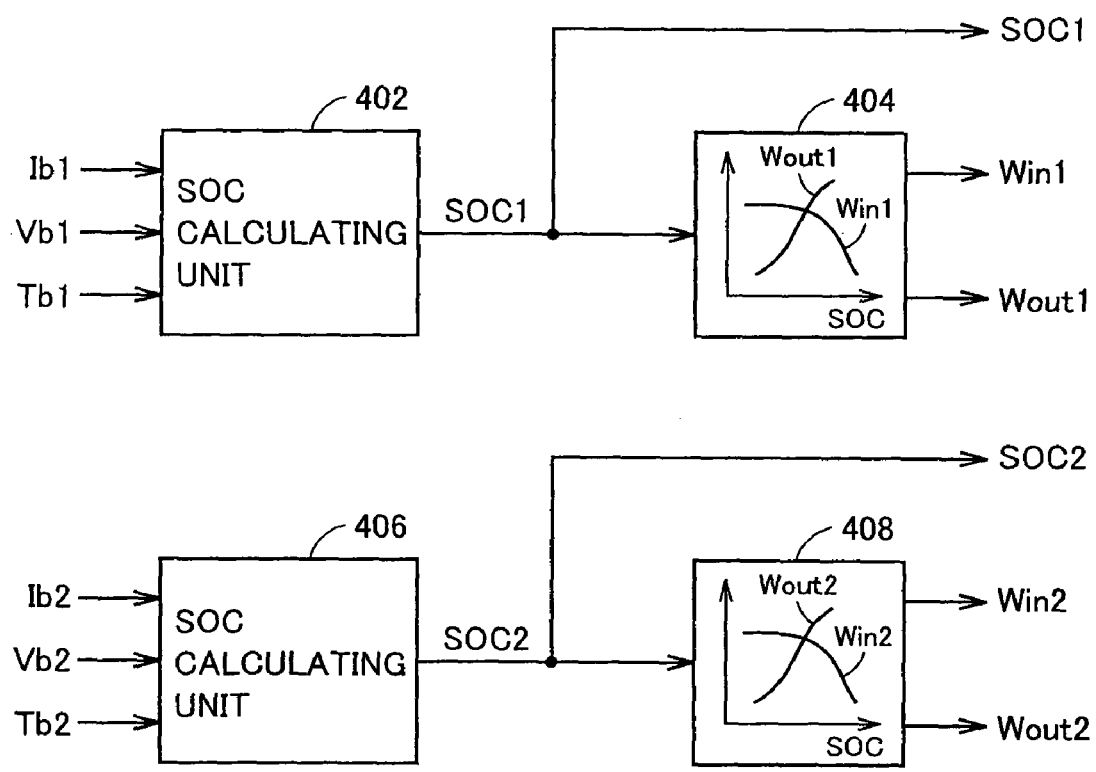
FIG. 2 is a block diagram representing a substantial portion of a battery ECU control structure.

Referring to FIG. 2, control structure of battery ECU 4 includes SOC calculating units 402 and 406, and allowable power determining units 404 and 408. SOC calculating unit 402 is for calculating SOC1 of power storage unit 6-1, and allowable power determining unit 404 is for determining allowable charging power Win1 and allowable discharging power Wout1 of power storage unit 6-1. SOC calculating unit 406 is for calculating SOC2 of power storage unit 6-2, and allowable power determining unit 408 is for determining allowable charging power Win2 and allowable discharging power Wout2 of power storage unit 6-2.

It is possible for SOC calculating unit 402 to calculate SOC1 using various known methods and, as an example, here, it is calculated using a tentative SOC calculated from an open-circuit voltage value and a corrected SOC calculated from integrated value of current value Ib1. Specifically, the open-circuit voltage value of power storage unit 6-1 is calculated based on current value Ib1 and voltage value Vb1 at each time point, and from a value corresponding to the open-circuit voltage value on a reference charge/discharge characteristic measured experimentally in advance, tentative SOC of power storage unit 6-1 is determined. Further, from the integrated value of current value Ib1, corrected SOC is derived, and by adding the corrected SOC and tentative SOC, SOC1 is provided.

In allowable power determining unit 404, characteristic values of allowable charging power Win1 and allowable discharging power Wout1 are stored in the form of a map in correspondence with SOC1, and allowable charging power Win1 and allowable discharging power Wout1 corresponding to SOC1 calculated by SOC calculating unit 402 are looked up in the map.

In the similar manner to SOC calculating unit 402 and allowable power determining unit 404, SOC2 and allowable charging power Win2 and allowable discharging power Wout2 are calculated by SOC calculating unit 406 and allowable power determining unit 408.

SOC1 and SOC2, allowable charging powers Win1 and Win2, and allowable discharging powers Wout1 and Wout2 calculated by SOC calculating units 402 and 406 and by allowable power determining units 404 and 408 in this manner are transmitted through control line 3 to HV-ECU 2 (FIG. 1).

Further, when SOC1 or SOC2 of power storage unit 6-1 or 6-2 is lower than a prescribed value, battery ECU 4 transmits a power generation request to HV-ECU 2.

Again referring to FIG. 1, HV-ECU 2 is a controller providing control for optimizing operations of each of engine 1 and motor generators 34-1 and 34-2, so that general fuel consumption efficiency of vehicle 100 is optimized in accordance with the state of running (torque request, power generation request from battery ECU 4 and the like) reflecting a driving operation (not shown). By way of example, HV-ECU 2 is formed using, as a main body, a micro-computer including a CPU (Central Processing Unit), and a storage such as an ROM (Read Only Memory) and an RAM (Random Access Memory).

Particularly, HV-ECU 2 in accordance with the present invention determines target load power values Pc1* and Pc2* to be exchanged between the main line ML and motor generators 34-1 and 34-2 such that these target values do not exceed a sum ΣWin of allowable charging powers and a sum ΣWout of allowable discharging powers, which are the sum of allowable charging powers Win1 and Win2 and allowable discharging powers Wout1 and Wout2, of power storage units 6-1 and 6-2, respectively. Then, in accordance with the determined target load power values Pc1* and Pc2*, switching commands PWM1 and PWM2 are generated. Thus, inverters 30-1 and 30-2 execute power converting operations such that powers exchanged between the main line ML and motor generators 34-1 and 34-2 attain the target load power values Pc1* and Pc2*, respectively.

Further, in the driving force generation system in accordance with the present embodiment, converter 8-1 executes a voltage converting operation in accordance with a "voltage control mode" so that the voltage value Vh appearing between the main positive line MPL and main negative line MNL attains to a prescribed target voltage value Vh*. The remaining converter 8-2 executes a voltage converting operation in a "power control mode" so that supply power Ps2 exchanged between the corresponding power storage unit 6-2 and main line ML attains to a corresponding target shared power value Ps2*.

In this manner, by causing one converter to perform the voltage converting operation in the voltage control mode, the voltage value Vh appearing between the main positive line MPL and main negative line MNL can be stabilized, and by causing the remaining converter to perform the voltage converting operation in the power control mode, power management of all power storage units can be implemented. Specifically, each of the remaining converters controls the charge/discharge power of the corresponding power storage unit, and inverters 30-1 and 30-2 control power exchanged between the main line ML and the motor generators 34-1 and 34-2, so that it is possible to indirectly control the charge/discharge power of power storage unit (in the present embodiment, power storage unit 6-1) that corresponds to the converter (in the present embodiment, converter 8-1) operating in the voltage control mode, because of the relation of power demand/supply in the entire system.

It is noted that in place of "power control mode", "current control mode" that controls current value of the current flowing between the corresponding power storage unit and the main line may be used, to implement power management of each power storage unit.

Figure 3:
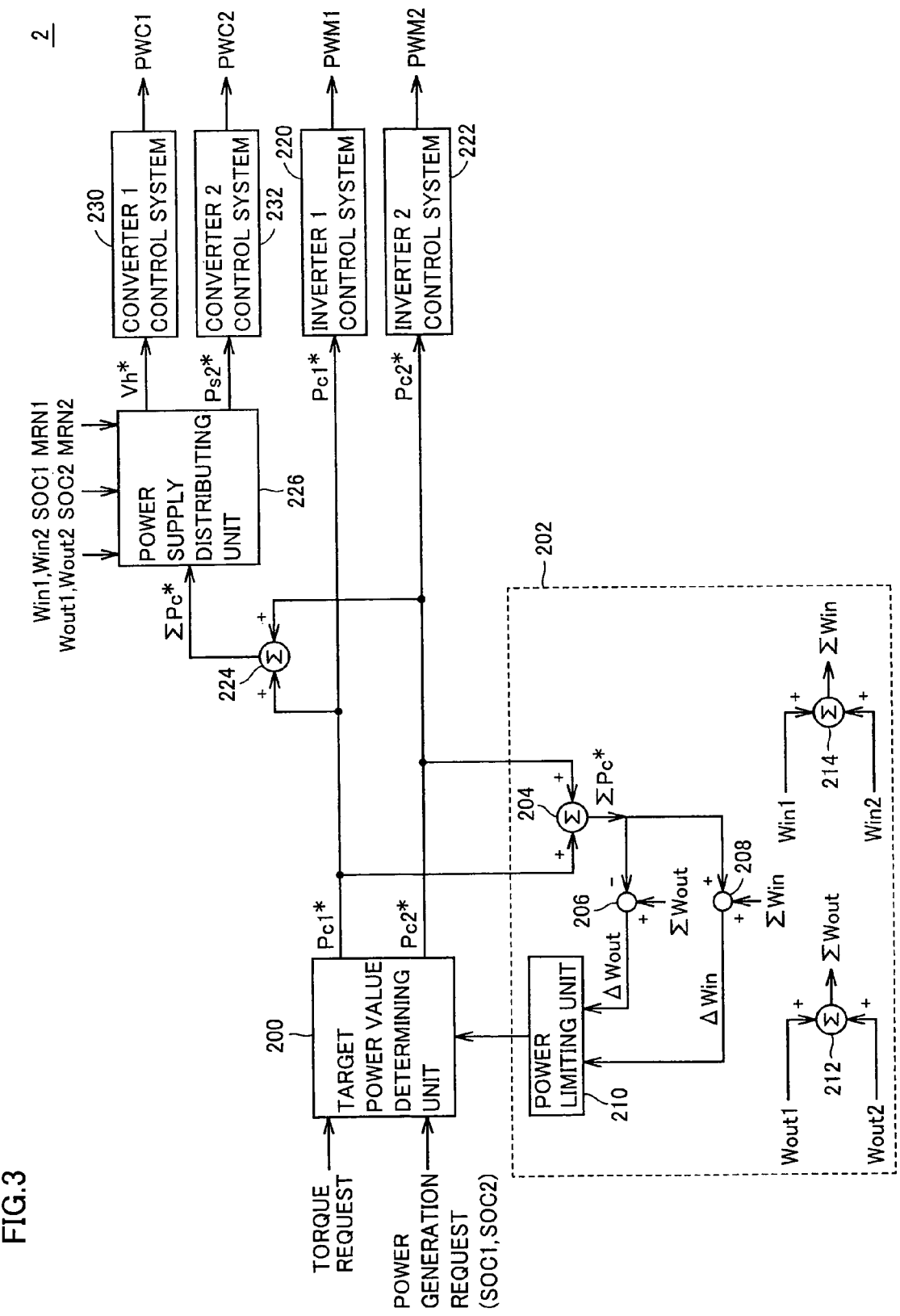
FIG. 3 is a block diagram representing a substantial portion of an HV-ECU control structure.

Referring to FIG. 3, the control structure of HV-ECU 2 includes a target power value determining unit 200, a target power value monitoring unit 202, an inverter 1 control system 220, an inverter 2 control system 222, a summation unit 224, a supply power distributing unit 226, a converter 1 control system 230, and a converter 2 control system 232.

Target power value determining unit 200 determines target load power values Pc1* and Pc2* in accordance with the state of running including the power generation requests (SOC1, SOC2) from battery ECU 4, torque request and the like. Here, target power value determining unit 200 determines target load power values Pc1* and Pc2* such that a sum ΣPc* of target load power values as the sum of target load power values Pc1* and Pc2* does not exceed the sum ΣWin of allowable charging powers and the sum ΣWout of allowable discharging powers, that is, the relation of −ΣWin≦ΣPc*≦ΣWout is satisfied.

Various methods may be applicable to determine the target load power values Pc1* and Pc2* under such conditions. In the present embodiment, a feedback type arrangement is used. Specifically, target load power values Pc1* and Pc2* tentatively determined by target power value determining unit 200 are monitored by target power value monitoring unit 202, and if the sum ΣPc* of target load power values exceeds the sum ΣWin of allowable charging powers or the sum ΣWout of allowable discharging powers, it issues a limit command to target power value determining unit 200.

Specifically, target power value monitoring unit 202 includes summation units 204, 212, 214, a subtracting unit 206, an adding unit 208, and a power limiting unit 210. Summation unit 212 sums allowable charging powers Win1 and Win2 of power storage units 6-1 and 6-2 to provide the sum ΣWin of allowable charging powers, and summation unit 214 sums allowable discharging powers Wout1 and Wout2 of power storage units 6-1 and 6-2 to provide the sum ΣWout of allowable discharging powers.

Further, summation unit 204 sums target load power values Pc1* and Pc2* determined by target power value determining unit 200 to provide the sum ΣPc* of target load power values, and applies the sum to subtracting unit 206 and adding unit 208. Subtracting unit 206 is a block for determining whether the sum ΣPc* of target load power values exceeds the sum ΣWout of allowable discharging powers, and it calculates a deviation ΔWout between the sum ΣPc* of target load power values and the sum ΣWout of allowable discharging powers, and applies it to power limiting unit 210. Further, adding unit 208 is a block for determining whether the sum ΣPc* of target load power values exceeds the sum ΣWin of allowable charging powers, and it calculates a deviation ΔWin between the sum ΣPc* of target load power values and the sum ΣWin of allowable charging powers, and applies it to power limiting unit 210. The sum ΣPc* of target load power values is determined such that the charging side has a negative value. The sum ΣWin of allowable charging powers is defined by a positive value. Therefore, deviation ΔWin is calculated by addition.

Power limiting unit 210 determines, based on the values of deviations ΔWout and ΔWin applied from subtracting unit 206 and adding unit 208, respectively, whether or not the sum ΣPc* of target load power values has exceeded the sum ΣWin of allowable charging powers and the sum ΣWout of allowable discharging powers. Specifically, if the deviation ΔWout or ΔWin has a negative value, it determines that the sum ΣPc* of target load power values has exceeded the sum ΣWin of allowable charging powers or the sum ΣWout of allowable discharging powers, respectively, and it applies a limit command to target power value determining unit 200. In response to the limit command, target power value determining unit 200 limits the target load power values Pc1* and Pc2*. Such an operation is repeated until the sum ΣPc* of target load power values comes to be within the range of the sum ΣWin of allowable charging powers and the sum ΣWout of allowable discharging powers.

The target load power values Pc1* and Pc2* determined in this manner are applied to inverter 1 control system 200 and inverter 2 control system 222, and a control operation as will be described later is executed, whereby switching commands PWM1 and PWM2 are generated.

An arrangement in which the target load power values Pc1* and Pc2* are determined in a feed-forward manner in the range of the sum ΣWin of allowable charging powers and the sum ΣWout of allowable discharging powers, using linear programming method or the like, is also possible.

If the target load power values Pc1* and Pc2* reach the sum ΣWin of allowable charging powers and the sum ΣWout of allowable discharging powers and is limited, increase in rotational speed of engine 1 is instructed, so as to supplement the shortage with respect to the torque request or power generation request (not shown). Consequently, decrease in drivability (driving characteristic) is made less noticeable to the driver.

Summation unit 224 applies the sum ΣPc* of target load power values obtained by adding target load power values Pc1* and Pc2*, to supply power distributing unit 226. Supply power distributing unit 226 determines target shared power values Ps1* and Ps2* such that the supply powers Ps1 and Ps2 shared by power storage units 6-1 and 6-2 do not exceed the corresponding allowable charging powers Win1 and Win2 and allowable discharging powers Wout1 and Wout2. Specifically, target shared power values Ps1* and Ps2* are distributed to satisfy the relations of −Win1≦Ps1*≦Wout1 and −Win2≦Ps2*≦Wout2.

If −ΣWin≠ΣPc* and ΣPc*≠ΣWout, degree of freedom in distributing target shared power values Ps1* and Ps2* is relatively high and it is preferred, for instance, to distribute in accordance with relative relation between SOCs. Specifically, if the sum ΣPc* of target load power values is on the discharging side (ΣPc*>0), the target shared power value of the power storage unit having higher SOC is determined to be relatively larger.

Of the target shared power values Ps1* and Ps2* determined in the above-described manner, only the target shared power value Ps2* is applied to converter 2 control system 232, and to converter 1 control system 230, the target voltage value Vh* is applied, which is in accordance with rotational speed MRN1 and MRN2 of motor generators 34-1 and 34-2. Then, the control operation, which will be described later, is executed, and switching commands PWC1 and PWC2 are generated.

It is unnecessary to apply the target shared power value Ps1* to converter 1 control system 230, from the following reason. Since there is a relation of Ps1*+Ps2*=Pc1*+Pc2*, when three other target values except for the target shared power value Ps1* are applied to respective control systems and power management is executed, power management in accordance with the target shared power value Ps1* can be realized in an indirect manner. It is also possible to apply the target shared power value Ps1* to converter 1 control system 230 and to apply the target voltage value Vh* to converter 2 control system 232.

The above-described processes can be represented by the following process flow.

Figure 4:
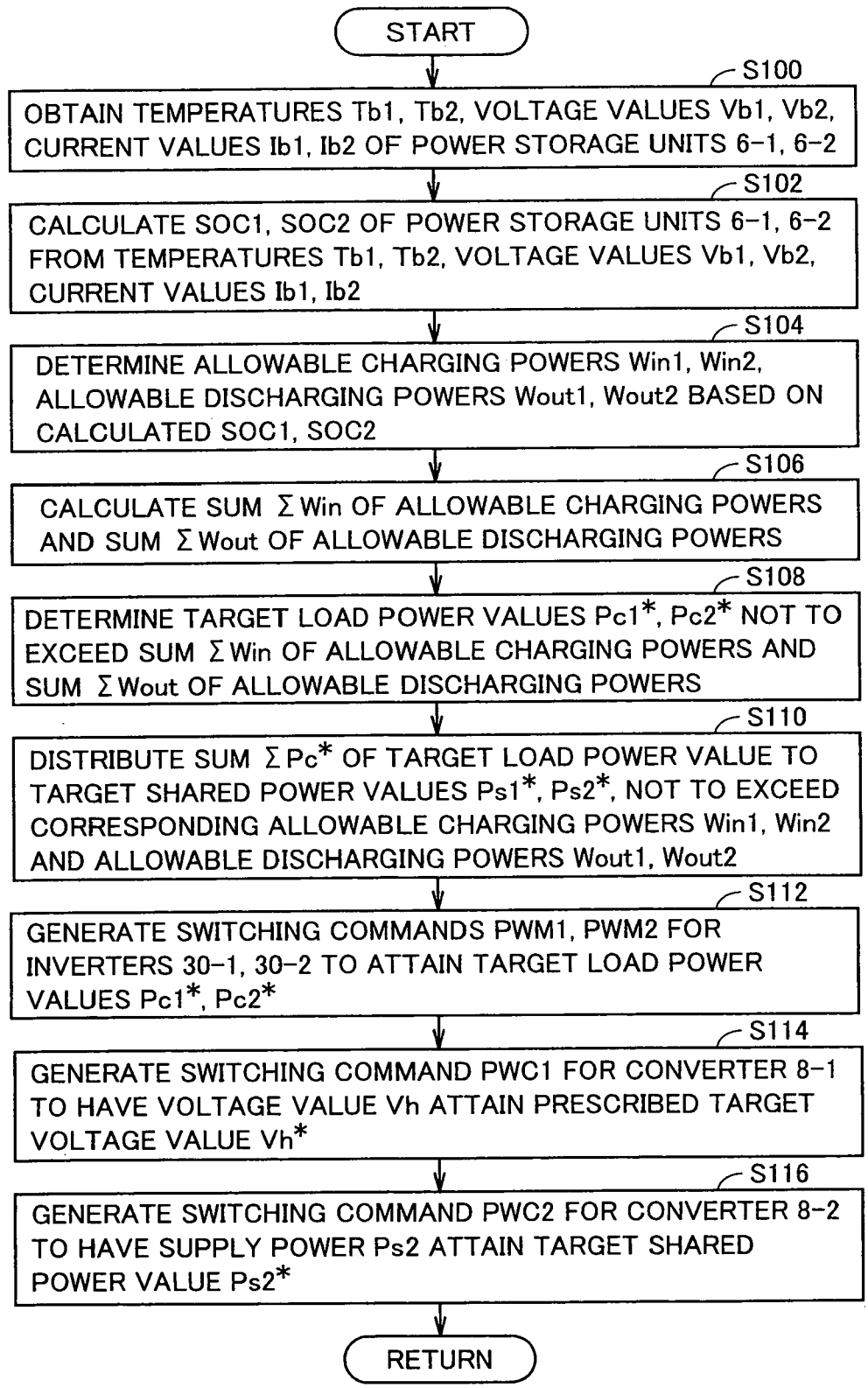
FIG. 4 is a flowchart representing a control method of the driving force generation system in accordance with Embodiment 1 of the present invention

FIG. 4 is a flowchart related to the method of controlling the driving force generation system in accordance with Embodiment 1 of the present invention. The flowchart shown in FIG. 4 can be implemented by HV-ECU 2 and battery ECU 4 executing programs stored in advance.

Referring to FIG. 4, battery ECU 4 obtains temperatures Tb1 and Tb2, voltage values Vb1 and Vb2, and current values Ib1 and Ib2 of power storage units 6-1 and 6-2 (step S100). Then, based on temperatures Tb1 and Tb2, voltage values Vb1 and Vb2, and current values Ib1 and Ib2, battery ECU 4 calculates SOC1 and SOC2 of power storage units 6-1 and 6-2 (step S102). Further, battery ECU 4 determines, based on calculated SOC1 and SOC2, allowable charging powers Win1 and Win2 and allowable discharging powers Wout1 and Wout2 of power storage units 6-1 and 6-2 (step S104). These calculated values of SOC1, SOC2, allowable charging powers Win1 and Win2 and allowable discharging powers Wout1 and Wout2 are transmitted from battery ECU 4 to HV-ECU 2.

HV-ECU 2 sums allowable charging powers Win1 and Win2 and allowable discharging powers Wout1 and Wout2, respectively, to calculate the sum ΣWin of allowable charging powers and the sum ΣWout of allowable discharging powers (step S106). Then, HV-ECU 2 determines target load power values Pc1* and Pc2* to be exchanged between main line ML and motor generators 34-1 and 34-2 such that the values do not exceed the sum ΣWin of allowable charging powers and the sum ΣWout of allowable discharging powers (step S108).

Then, HV-ECU 2 distributes the sum ΣPc* of target load power values to target load power values Ps1* and Ps2* such that supply powers Ps1 and Ps2 to be shared by power storage units 6-1 and 6-2 do not exceed the corresponding, allowable charging powers Win1 and Win2 and allowable discharging powers Wout1 and Wout2 (step S110).

HV-ECU 2 generates switching commands PWM1 and PWM2 to inverters 30-1 and 30-2, such that the powers exchanged between the main line ML and motor generators 34-1 and 34-2 attain to the target load power values Pc1* and Pc2*, respectively (step S112). Further, HV-ECU 2 generates switching command PWC1 to converter 8-1, such that the voltage value Vh appearing between main positive line MPL and main negative line MNL attains to the prescribed target voltage value Vh* (step S114). Further, HV-ECU 2 generates switching command PWC2 to converter 8-2 such that the supply power Ps2 exchanged between the corresponding power storage unit 6-2 and the main line ML attains to the target shared power value Ps2* (step S116).

The process described above is repeatedly executed as long as vehicle 100 is in the IGON (ignition on) state.

Next, the power conversion operation of inverters 30-1 and 30-2 will be described.

Figure 5:
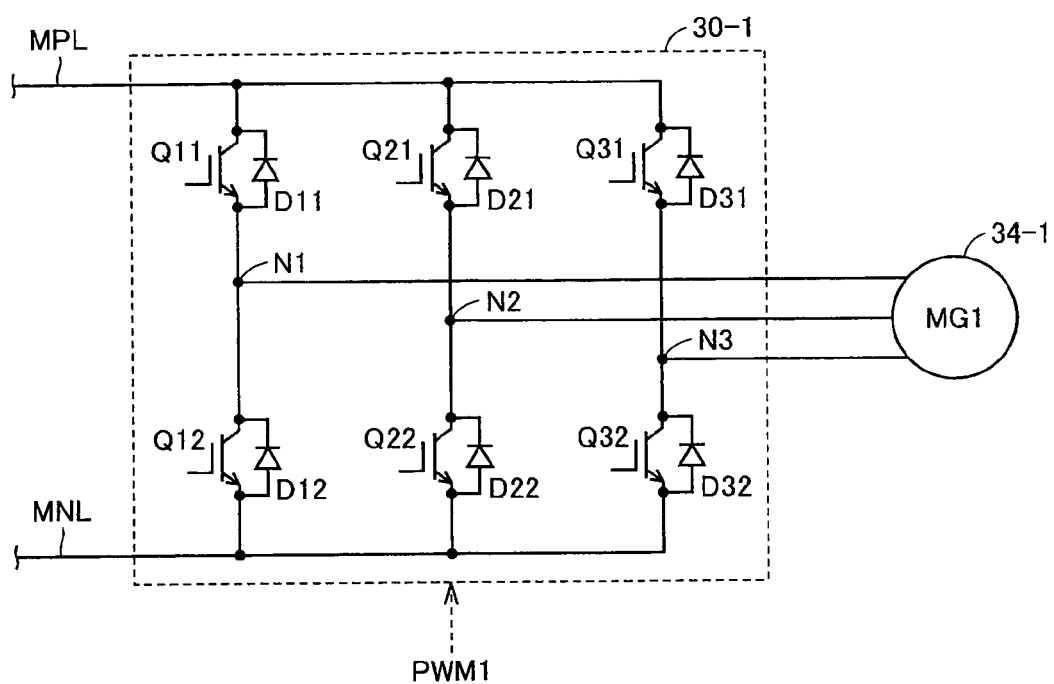
FIG. 5 shows a schematic configuration of an inverter.

Referring to FIG. 5, inverter 30-1 includes transistors Q11 and Q12, Q21 and Q22, and Q31 and Q32 forming U-, V- and W-phase arm circuits, and each arm circuit is connected between main positive line MPL and main negative line MNL. Connection nodes N1, N2 and N3 of transistors in respective arm circuits are connected to corresponding phases of motor generator 34-1, and corresponding phase voltages are supplied to motor generator 34-1. By way of example, transistors Q11, Q12, Q21, Q22, Q31, and Q32 are formed of IGBTs (Insulated Gate Bipolar Transistors).

Further, inverter 30-1 includes diodes D11, D12, D21, D22, D31, and D32, and each of the diodes is connected in parallel with the corresponding transistor such that it can cause a feedback current to flow from the emitter side to the collector side of the transistor having the same reference number.

In inverter 30-1, transistors Q11, Q32, Q21, Q12, Q31, and Q22 are activated (rendered conductive) successively in this order, for example, in response to the switching command PWM1, whereby power converting operation between DC power and AC power is implemented. Further, by adjusting the period (duty ratio) and phase (timing) of conducting each transistor, the amount of power conversion and the direction of power conversion (DC power to AC power or AC power to DC power) can be controlled.

Inverter 30-2 has a similar structure and, therefore, detailed description thereof will not be repeated.

In order to control power exchanged between the main line ML and motor generators 34-1 and 34-2, vector control is executed, using a current value on a rotational coordinates of motor generators. In vector control, the current value of each phase is converted to a d-axis (direct axis) current and q-axis (quadrature axis) current, and vector control provides easy control of torque generated in the motor generator. Therefore, it also enables control of power (torque×rotational speed) consumed or generated by the motor generator.

Figure 6:
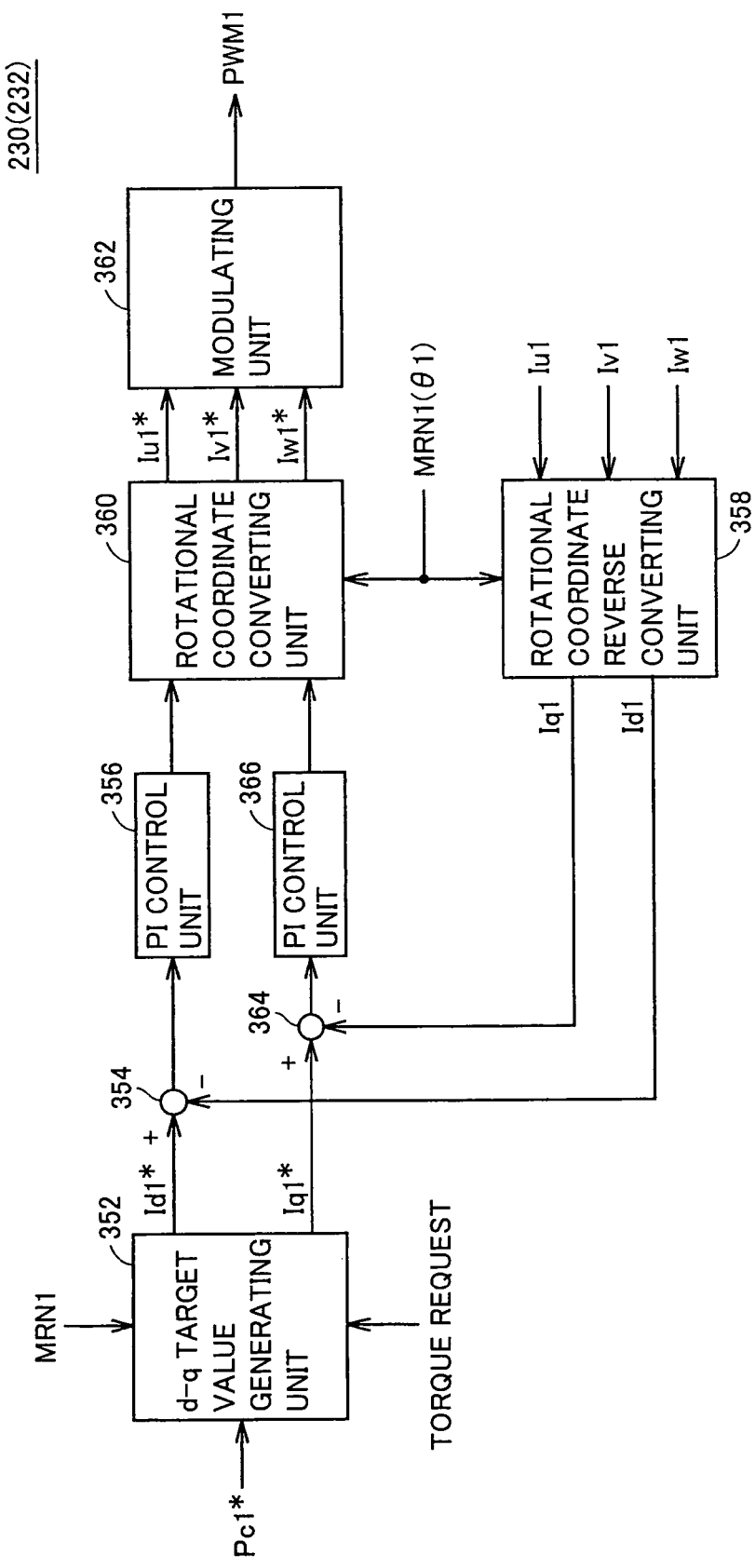
FIG. 6 is a block diagram representing a more detailed control structure of a converter 1 control system.

FIG. 6 is a block diagram representing a more detailed control structure of converter 1 control system 230.

Referring to FIG. 6, converter 1 control system 230 includes a d-q target value generating unit 352, subtracting units 354 and 364, PI control units 356 and 366, a rotational coordinate converting unit 360, a modulating unit 362, and a rotational coordinate reverse-converting unit 358.

The d-q target value generating unit 352 generates direct axis target current value Id1* and quadrature axis target current value Iq1*, based on the target load power value Pc1* calculated by target power value determining unit 200 (FIG. 3). In connection with this generation, rotational speed MRN1 of motor generator 34-1 and torque request are referred to. The generated direct axis target current value Id1* and quadrature axis target current value Iq1* are output to subtracting units 354 and 364, respectively.

To subtracting units 354 and 364, current direct axis current value Id1 and quadrature axis current value Iq1 are input, and deviations with respect to the direct axis target current value Id1* and quadrature axis target current value Iq1* are calculated, respectively. The direct axis current value Id1 and quadrature axis current value Iq1 are calculated in accordance with a prescribed arithmetic expression, based on the actually measured phase current values Iu1, Iv1 and Iw1 and rotational speed MRN1 (more accurately, electric angle θ1 of motor generator 34-1), by rotational coordinate reverse-converting unit 358. In this manner, subtracting units 354 and 364 form a feedback control system that compares the target value with the actually measured value for reflecting the result on the control output.

PI control units 356 and 365 each include a proportional element (P) and an integral element (I), receive the current deviations applied from subtracting units 354 and 364, respectively, and calculate PI output values in accordance with a prescribed proportional gain and integral gain.

PI output values (d-axis component and q-axis component) output from PI control units 356 and 366 are converted by rotational coordinate converting unit 360 to target phase current values Iu1*, Iv1* and Iw1*, and applied to modulating unit 362.

Modulating unit 362 compares each of target phase current values Iu1*, Iv1* and Iw1* with a carrier wave generated by an oscillating unit, not shown, and generates the switching command PWM1.

Using the control structure as described above, the load power Pc1 flowing through inverter 30-1 is controlled. Inverter 30-2 is similar to inverter 30-1 and, therefore, detailed description will not be repeated.

Next, a power converting operation in converters 8-1 and 8-2 will be described.

Figure 7:
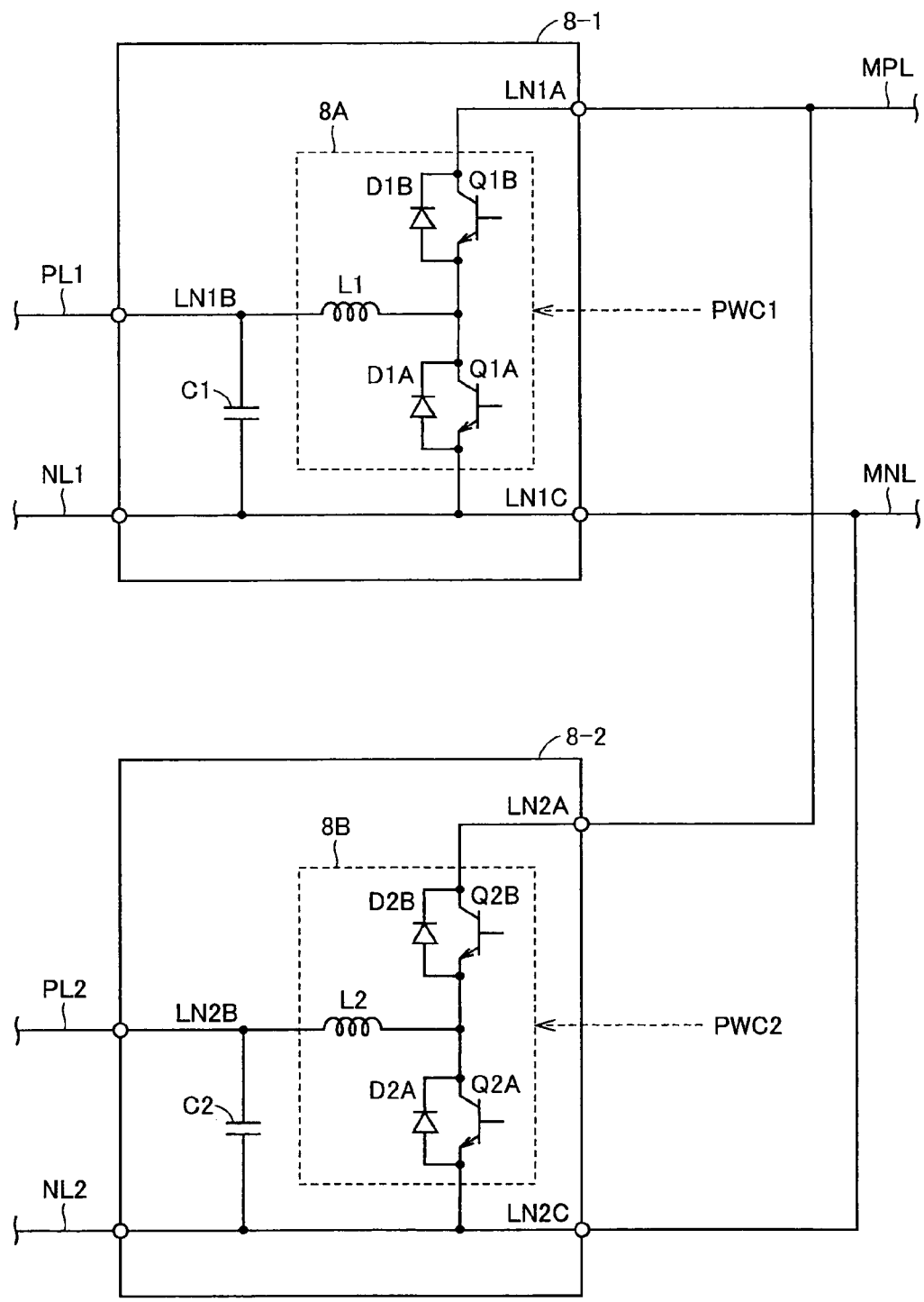
FIG. 7 shows a schematic configuration of a converter.

FIG. 7 schematically shows the structures of converters 8-1 and 8-2.

Referring to FIG. 7, converters 8-1 and 8-2 are chopper type voltage boosting/lowering circuits, including voltage stepping up/down chopper circuits 8A and 8B, respectively.

Voltage step up/down chopper circuit 8A includes two series-connected transistors Q1A and Q1B. Transistors Q1A and Q1B have one end connected to main positive line MPL through a line LN1A and the other end connected to a line LN1C commonly connecting main negative line MNL to a negative line NL1. Further, connection node between transistors Q1A and Q1B is connected to a positive line PL1 through an inductor L1 and a line LN1B. Further, between the collector and emitter of transistors Q1A and Q1B, diodes D1A and D1B are connected in parallel, respectively allowing current flow from the emitter side to the collector side.

Further, between positive line PL1 and negative line NL1, a smoothing capacitor C1 is connected, for reducing AC component included in the power exchanged between power storage unit 6-1 and converter 8-1. Further, smoothing capacitor C1 also attains an effect of absorbing rush current generated at the moment when power storage unit 6-1 and converter 8-1 are electrically connected, and thereby preventing damage to transistors Q1A and Q1B and diodes D1A and D1B caused by the rush current.

Transistors Q1A and Q1B performing switching operations in response to the switching command PWC1 provide the voltage boosting and lowering operations. In the voltage boosting operation, transistor Q1B is kept on, while transistor Q1A switches at a prescribed duty ratio. By the switching operation of transistor Q1A, storage and releasing of electromagnetic energy are repeated in inductor L1, and the voltage corresponding to the electromagnetic energy is accumulatively output to the side of main line ML. In the voltage lowering operation, transistor Q1A is kept off, and transistor Q1B switches at a prescribed duty ratio. By the switching operation, current flows in transistor Q1B only in the period corresponding to the duty ratio and, therefore, the voltage lowered in accordance with the duty ratio is output to the positive line PL1 and negative line NL1.

The voltage step up/down chopper circuit 8B included in converter 8-2 has the same structure and operates in the similar manner as voltage step up/down chopper circuit 8A included in converter 8-1 and, therefore, detailed description will not be repeated.

As described above, converter 8-1 executes the voltage converting operation in accordance with the "voltage control mode" to cause the voltage value Vh to attain the target voltage value Vh*, and converter 8-2 executes the voltage converting operation in accordance with the "power control mode" to cause the supply power Ps2 to attain the target shared power value Ps2*.

Figure 8:
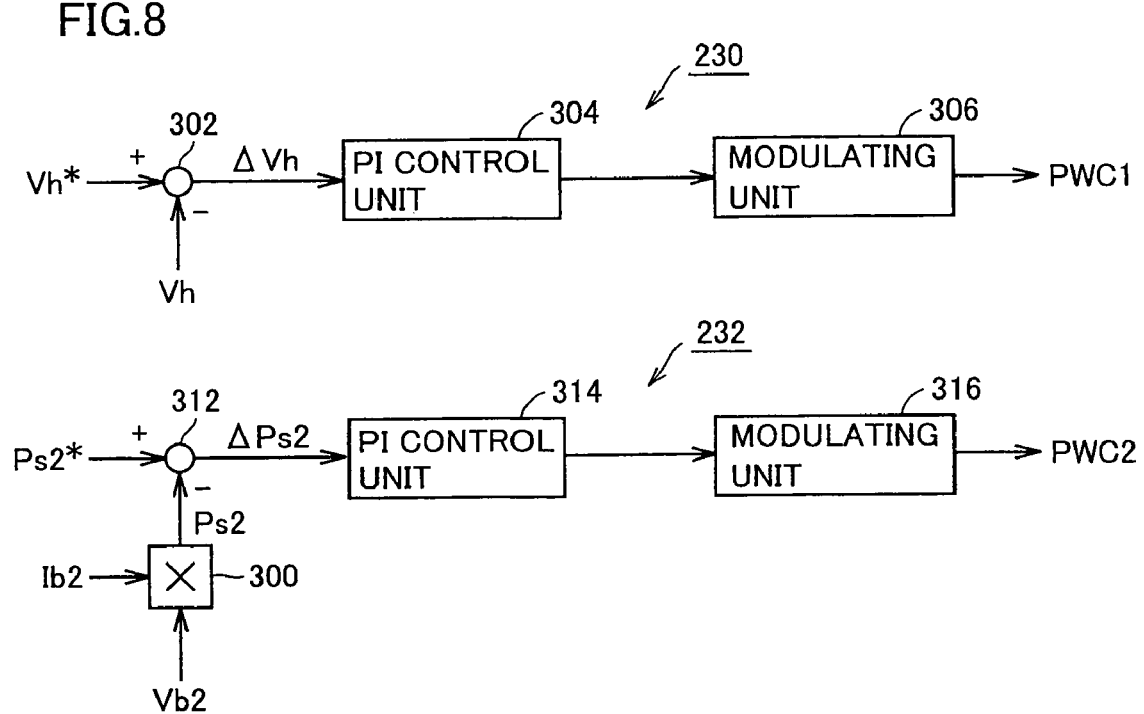
FIG. 8 is a block diagram representing a more detailed control structure of converter 1 control system and converter 2 control system.

FIG. 8 is a block diagram showing a more detailed control structure of converter 1 control system 230 and converter 2 control system 232.

Referring to FIG. 8, converter 1 control system 230 includes a subtracting unit 302, a PI control unit 304, and a modulating unit 306. Further, converter 2 control system 232 includes a multiplying unit 300, a subtracting unit 312, a PI control unit 314, and a modulating unit 316.

In converter 1 control system 230, a deviation ΔVh of actually measured voltage value Vh with respect to the prescribed target voltage value Vh* is calculated at subtracting unit 302, and output to PI control unit 304. PI control unit 304 includes a proportional element (P) and an integral element (I), and calculates a PI output value for the deviation ΔVh in accordance with a prescribed proportional gain and integral gain. The calculated PI output value is applied to modulating unit 306, and modulating unit 306 compares the PI output value with a carrier wave generated by an oscillating unit, not shown, and generates the switching command PWC1.

In this manner, in converter 1 control system 230, a feedback control system based on the actually measured voltage value Vh is formed, and a voltage converting operation in accordance with the "voltage control mode" is implemented, to have the voltage value Vh attain the prescribed target voltage value Vh*.

In converter 2 control system 232, deviation ΔPs2 of actually supplied power Ps2 with respect to the target shared power value Ps2* is calculated at subtracting unit 312, and output to PI control unit 314. Here, the supply power Ps2 is calculated by multiplying the actually measured current value Ib2 by the voltage value Vb2 by multiplying unit 300.

PI control unit 314 includes, as does PI control unit 304, a proportional element (P) and an integral element (I), and calculates the PI output value for the deviation ΔPs in accordance with prescribed proportional gain and integral gain. The calculated PI output value is applied to modulating unit 316, and modulating unit 316 compares the PI output value with a carrier wave generated by an oscillating unit, not shown, and generates a switching command PWC2.

In this manner, in converter 2 control system 232, a feedback control system for the calculated (actually measured) supply power Ps2 is formed, and a voltage converting operation in accordance with the "power control mode" is implemented to have the supply power Ps2 attain the prescribed target shared power value Ps2*.

According to Embodiment 1 of the present invention, allowable charging power Win and allowable discharging power Wout at each of the plurality of power storage units are determined in advance, and the sum ΣWin of allowable charging powers and the sum ΣWout of allowable discharging powers as the sum of allowable charging powers Win and the sum of allowable discharging powers of the power storage units are calculated. Within the range of calculated sum ΣWin of allowable charging powers and calculated sum ΣWout of allowable discharging powers, the target load power value to be exchanged between the main line ML and the motor generator is determined. Therefore, when the motor generator operates (when driving force is generated), flow of power exceeding the tolerable capacity of power supply or power regeneration at each power storage unit can be prevented. Therefore, power management for the entire system protecting a plurality of power storage units becomes possible.

Embodiment 2

Figure 9:
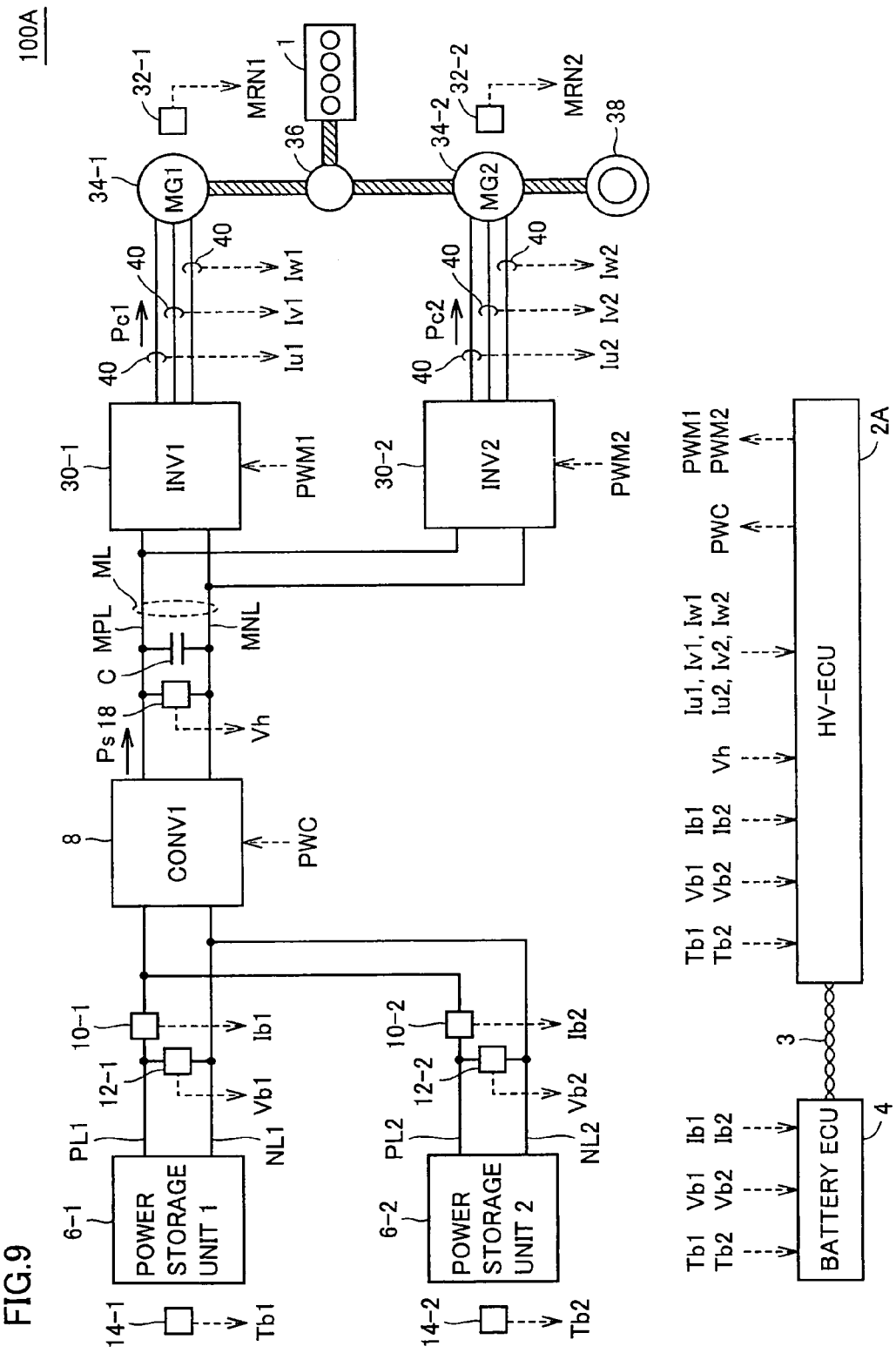
FIG. 9 is a schematic diagram representing a substantial portion of a vehicle provided with the driving force generation system in accordance with Embodiment 2 of the present invention.

FIG. 9 is a schematic diagram showing a substantial portion of a vehicle 100A provided with the driving force generation system in accordance with Embodiment 2 of the present invention.

Referring to FIG. 9, vehicle 100A corresponds to vehicle 100 shown in FIG. 1 above with converters 8-1 and 8-2 replaced by a single converter 8. Except for the control structure of HV-ECU 2A controlling converter 8, the vehicle is the same as vehicle 100 and, therefore, detailed description of other portions will not be repeated.

Converter 8 is arranged between power storage units 6-1 and 6-2 and main line ML, and executes the power converting operation. The structure is the same as that of converter 8-1 and, by way of example, it is formed of a "chopper" type voltage step up/down circuit.

By providing a single converter 8 for the plurality of power storage units 6-1 and 6-2, the space and cost can advantageously be reduced. The charge/discharge power, however, cannot be individually controlled in each of the power storage units 6-1 and 6-2. Specifically, converter 8 only controls the charge/discharge power of power storage units 6-1 and 6-2 as a whole, and the ratio of supply powers Ps1 and Ps2 shared by power storage unit 6-1 and 6-2, respectively, is determined uniquely in accordance with internal resistance values of power storage unit 6-1 and 6-2. Specifically, a power storage unit having relatively smaller internal resistance value inevitably comes to handle relatively larger supply power. Therefore, in the driving force generation system in accordance with Embodiment 2, unless power storage units 6-1 and 6-2 have the same internal resistance values, it is impossible to maximally utilize the range of the sum ΣWin of allowable charging powers or the sum ΣWout of allowable discharging powers.

Therefore, in the driving force generation system in accordance with Embodiment 2, based on the deviation determined in accordance with the internal resistance values of power storage units 6-1 and 6-2, the sum ΣWin of allowable charging powers and the sum ΣWout of allowable discharging powers are multiplied by a prescribed limit value (in the following, referred to as "uniform share ratio"), and the target load power values Pc1* and Pc2* are determined.

Figure 10A:
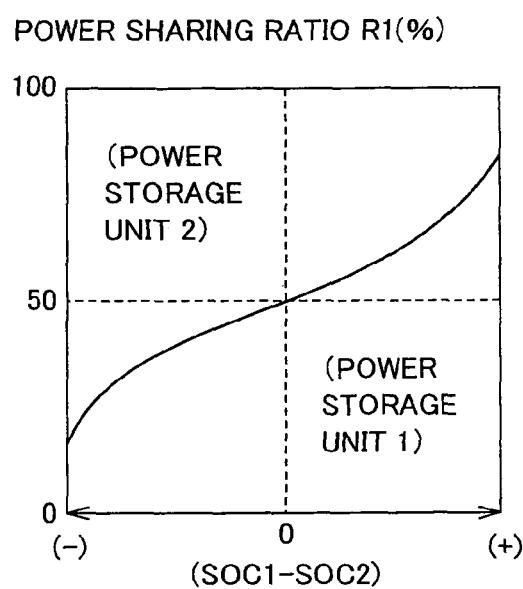
FIGS. 10A and 10B are graphs representing ratio of power sharing by power storage units of the driving force generation system in accordance with Embodiment 2 of the present invention.
Figure 10B:
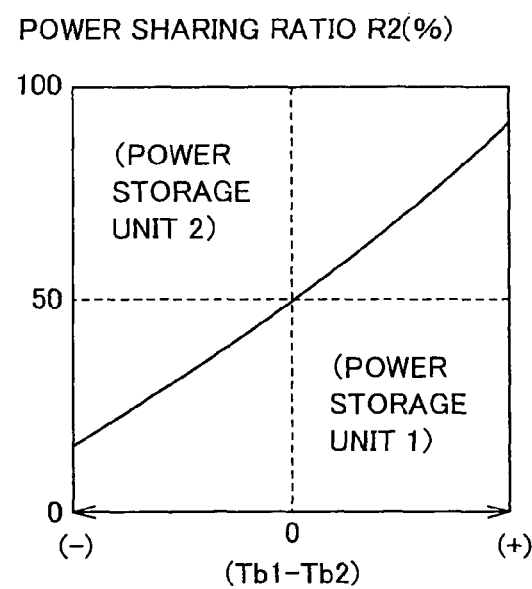

FIGS. 10A and 10B are graphs schematically showing ratio of power sharing by power storage units 6-1 and 6-2 in the driving force generation system in accordance with Embodiment 2 of the present invention. FIG. 10A focuses on SOC1 and SOC2 of power storage units 6-1 and 6-2. FIG. 10B focuses on temperatures Tb1 and Tb2 of power storage units 6-1 and 6-2. FIGS. 10A and 10B show examples when power storage units 6-1 and 6-2 have the same full-charge capacity.

Generally, in a power storage unit, its internal resistance value tends to decrease as SOC attains higher. Therefore, of the two power storage units, one having relatively higher SOC comes to have larger share of power.

Referring to the characteristic of power share ratio R1 with respect to the deviation between SOC1 and SOC2 shown in FIG. 10A, if SOC1=SOC2, theoretically, internal resistance values are the same with each other. Therefore, power share ratio R1 of power storage units 6-1 and 6-2 is 50% each. If SOC1>SOC2, internal resistance of power storage unit 6-1 lowers relatively, and hence, the power share ratio R1 thereof becomes larger than 50%. If SOC1<SOC2, internal resistance of power storage unit 6-1 increases relatively, and hence, the power share ratio R1 thereof becomes smaller than 50%.

Generally, the internal resistance value of a power storage unit tends to be lower as its temperature Tb increases. Therefore, of the two power storage units, one having higher temperature Tb comes to have larger share of power.

Referring to the characteristic of power share ratio R2 with respect to the deviation between temperatures Tb1 and Tb2 shown in FIG. 10B, if temperatures Tb1=Tb2, theoretically, internal resistance values are the same with each other. Therefore, power share ratio R1 of power storage units 6-1 and 6-2 is 50% each. If temperature Tb1>temperature Tb2, internal resistance of power storage unit 6-1 lowers relatively, and hence, the power share ratio R2 thereof becomes larger than 50%. If temperature Tb1<temperature Tb2, internal resistance of power storage unit 6-1 increases relatively, and hence, the power share ratio R2 thereof becomes smaller than 50%.

From the foregoing, it can be seen that the target shared power values Ps1* and Ps2* of power storage units 6-1 and 6-2, respectively, must satisfy both of the following relations including power share ratios R1 and R2.

$$-Win1 \leq Ps1^* = R1 \times R2 \times \Sigma Pc^* \leq Wout1$$

$$-Win2 \leq Ps2^* = (1-R1 \times R2) \times \Sigma Pc^* \leq Wout2$$

Specifically, target shared power values Ps1* and Ps2* are limited not only by allowable charging powers Win1 and Win2 and allowable discharging powers Wout1 and Wout2 but also by power share ratios R1 and R2. Therefore, the sum ΣWin of allowable charging powers and the sum ΣWout of allowable discharging powers are multiplied by the uniform share ratio reflecting power share ratios R1 and R2 to calculate substantially allowable values, and then, the target shared power values Ps1* and Ps2* are determined.

Figure 11:
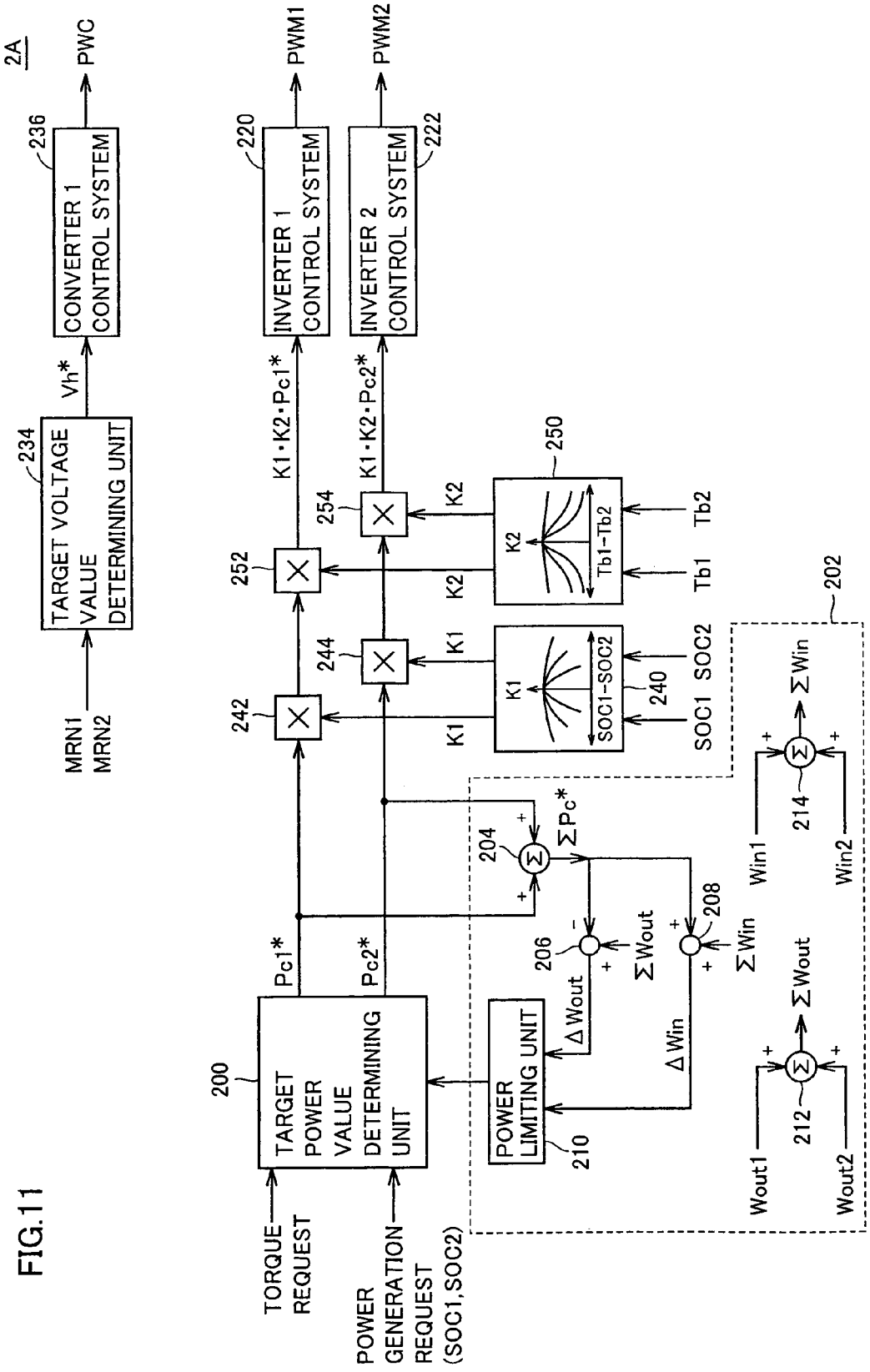
FIG. 11 is a block diagram representing a substantial portion of HV-ECU control structure.

FIG. 11 is a block diagram showing a substantial portion of the control structure of HV-ECU 2A.

Referring to FIG. 11, the control structure of HV-ECU 2A corresponds to the control structure of HV-ECU 2 shown in FIG. 3, and it additionally includes multiplying units 242, 244, 252, 254 and uniform share ratio determining units 240 and 250, and includes a target voltage determining unit 234 and a converter control system 236, in place of summation unit 224, supply power distributing unit 226, converter 1 control system 230 and converter 2 control system 232.

Multiplying units 242 and 244 multiply target load power values Pc1* and Pc1* determined by target power value determining unit 200 by the uniform share ratio K1 ($0 < K1 \leq 1$) applied from uniform share ratio determining unit 240, and output the results.

Similarly, multiplying units 252 and 254 multiply the results of multiplication by multiplying units 242 and 244 by the uniform share ratio K2 ($0 < K2 \leq 1$) applied from uniform share ratio determining unit 250, and output the results to inverter 1 control system 220 and inverter 2 control system 222.

Uniform share ratio determining unit 240 is a block for determining uniform share ratio K1 based on SOC1 and SOC2 of power storage units 6-1 and 6-2, and stores a map of uniform share ratio K1 defined using SOC1 and SOC2 as parameters.

Figure 12:
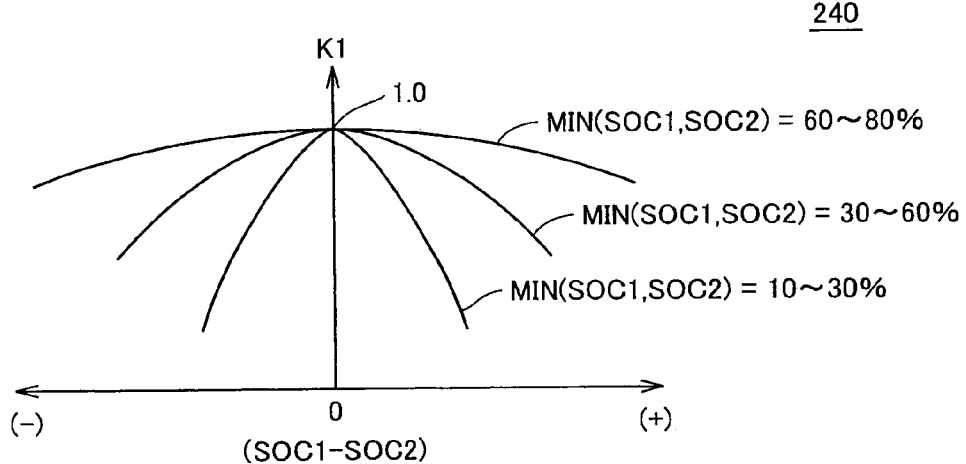
FIG. 12 is a schematic diagram representing a map stored in a uniform share ratio determining unit.

FIG. 12 is a schematic diagram showing the map stored in uniform share ratio determining unit 240.

Referring to FIG. 12, in the map of uniform share ratio determining unit 240, the magnitude of SOC, which is the smaller one of SOC1 and SOC2, is classified, and for each class, the uniform share ratio K1 is defined in correspondence with the deviation (SOC1−SOC2) between SOC1 and SOC2. FIG. 12 shows an example in which the SOC magnitude is divided into three classes.

As the deviation between SOC1 and SOC2 becomes larger, that is, as the deviation between the internal resistance values of power storage units 6-1 and 6-2 becomes larger, the uniform share ratio K1 becomes smaller. This means that, as the deviation between SOC1 and SOC2 becomes larger, degree of unevenness between the powers shared by power storage units 6-1 and 6-2 increases and, as a result, allowable power range substantially becomes smaller.

Again referring to FIG. 11, uniform share ratio determining unit 250 is a block for determining uniform share ratio K2 based on temperatures Tb1 and Tb2 of power storage units 6-1 and 6-2, and it stores a map of uniform share ratio K2 defined using temperatures Tb1 and Tb2 as parameters.

Figure 13:
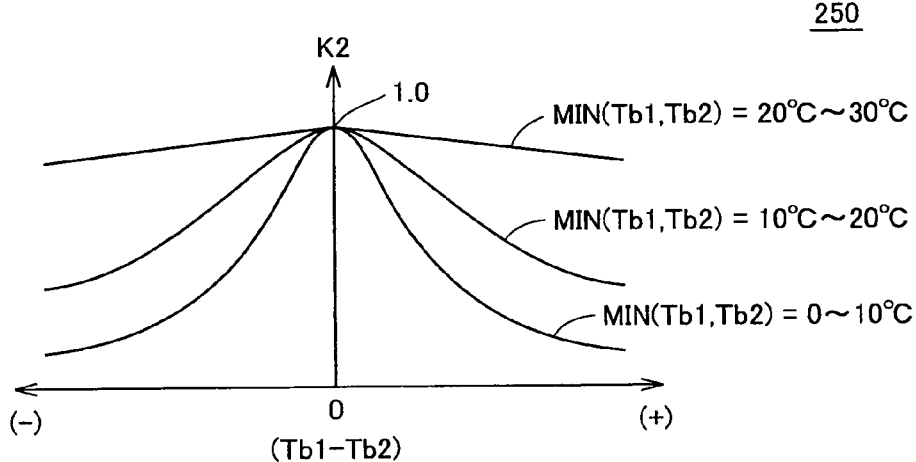
FIG. 13 is a schematic diagram representing a map stored in a uniform share ratio determining unit.

FIG. 13 is a schematic diagram showing the map stored in uniform share ratio determining unit 250.

Referring to FIG. 13, in the map of uniform share ratio determining unit 250, the temperature, which is the lower one of temperatures Tb1 and Tb2, is classified, and for each class, the uniform share ratio K2 is defined in correspondence with the deviation (Tb1−Tb2) between temperatures Tb1 and Tb2. FIG. 13 shows an example in which the magnitude of temperature Tb is divided into three classes.

As shown in FIG. 13, as the deviation between temperatures Tb1 and Tb2 becomes larger, that is, as the deviation between the internal resistance values of power storage units 6-1 and 6-2 becomes larger, the uniform share ratio K2 becomes smaller. This means that, similar to the uniform share ratio K1 shown in FIG. 12, as the deviation between temperatures Tb1 and Tb2 becomes larger, degree of unevenness between the powers shared by power storage units 6-1 and 6-2 increases and, as a result, allowable power range substantially becomes smaller.

In FIGS. 10, 12 and 13, for convenience of description, an example is shown in which power storage units 6-1 and 6-2 have the same full-charge capacity. Such an example is not limiting. Specifically, by forming a map of uniform share ratio in consideration of internal resistance values of power storage units 6-1 and 6-2 in the standard state in addition to SOC1 and SOC2 and temperatures Tb1 and Tb2, the approach can be applied even when full-charge capacities are different. If the full-charge capacities are different, the position at which the uniform share ratio attains to "1.0" may be shifted in either direction, or the characteristic curve may not be symmetrical. Such a map can be obtained experimentally.

Again referring to FIG. 11, target load power values Pc1* and Pc2* are multiplied by uniform share ratios K1 and K2 at multiplying units 242 and 244 and multiplying unit 252 and 254, respectively, and applied to inverter 1 control system 220 and inverter 2 control system 222. Inverter 1 control system 220 and inverter 2 control system 222 generate switching commands PWM1 and PWM2 to inverters 30-1 and 30-2, so that the powers exchanged between the main line ML and motor generators 34-1 and 34-2 attain to the target load power values K1·K2·Pc1* and K1·K2·Pc2*, respectively.

In the driving force generation system in accordance with Embodiment 2 of the present invention, target load power values Pc1* and Pc2* are limited in consideration of the power that can be shared by each power storage unit. Thus, it is unnecessary for converter 8 to control the power exchanged between main line ML and power storage units 6-1 and 6-2. Therefore, converter 8 executes the voltage converting operation in accordance with the voltage control mode. In order to control the voltage converting operation of converter 8, target voltage value determining unit 234 determines the target voltage value Vh* with reference to rotational speed MRN1 and MRN2 of motor generators 34-1 and 34-2, and applies it to converter control system 236.

Figure 14:
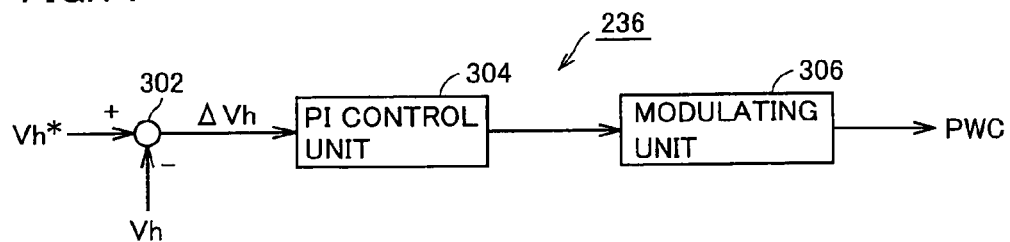
FIG. 14 is a block diagram representing a more detailed control structure of a converter control system.

FIG. 14 is a block diagram showing a more detailed control structure of converter control system 236.

Referring to FIG. 14, converter control system 236 has a similar structure as converter 1 control system 230 shown in FIG. 8, and it includes a subtracting unit 302, a PI control unit 304, and a modulating unit 306.

In converter control system 236, the deviation ΔVh of the actually measured voltage value Vh with respect to a prescribed target voltage value Vh* is calculated by subtracting unit 302, and output to PI control unit 304. PI control unit 304 calculates a PI output value for the deviation ΔVh in accordance with prescribed proportional gain and integral gain, and modulating unit 306 generates a switching command PWC in accordance with the PI output value.

Except for this point, the system is the same as the driving force generation system in accordance with Embodiment 1 and, therefore, detailed description will not be repeated.

In the block diagram shown in FIG. 11, a structure has been illustrated in which the uniform share ratio K1 determined dependent on SOC1 and SOC2 of power storage units 6-1 and 6-2 and the uniform share ratio K2 dependent on temperatures Tb1 and Tb2 of power storage units 6-1 and 6-2 are used. It is noted, however, that only one of uniform share ratios K1 and K2 may be used.

The above-described processes can be represented by the following process flow.

Figure 15:
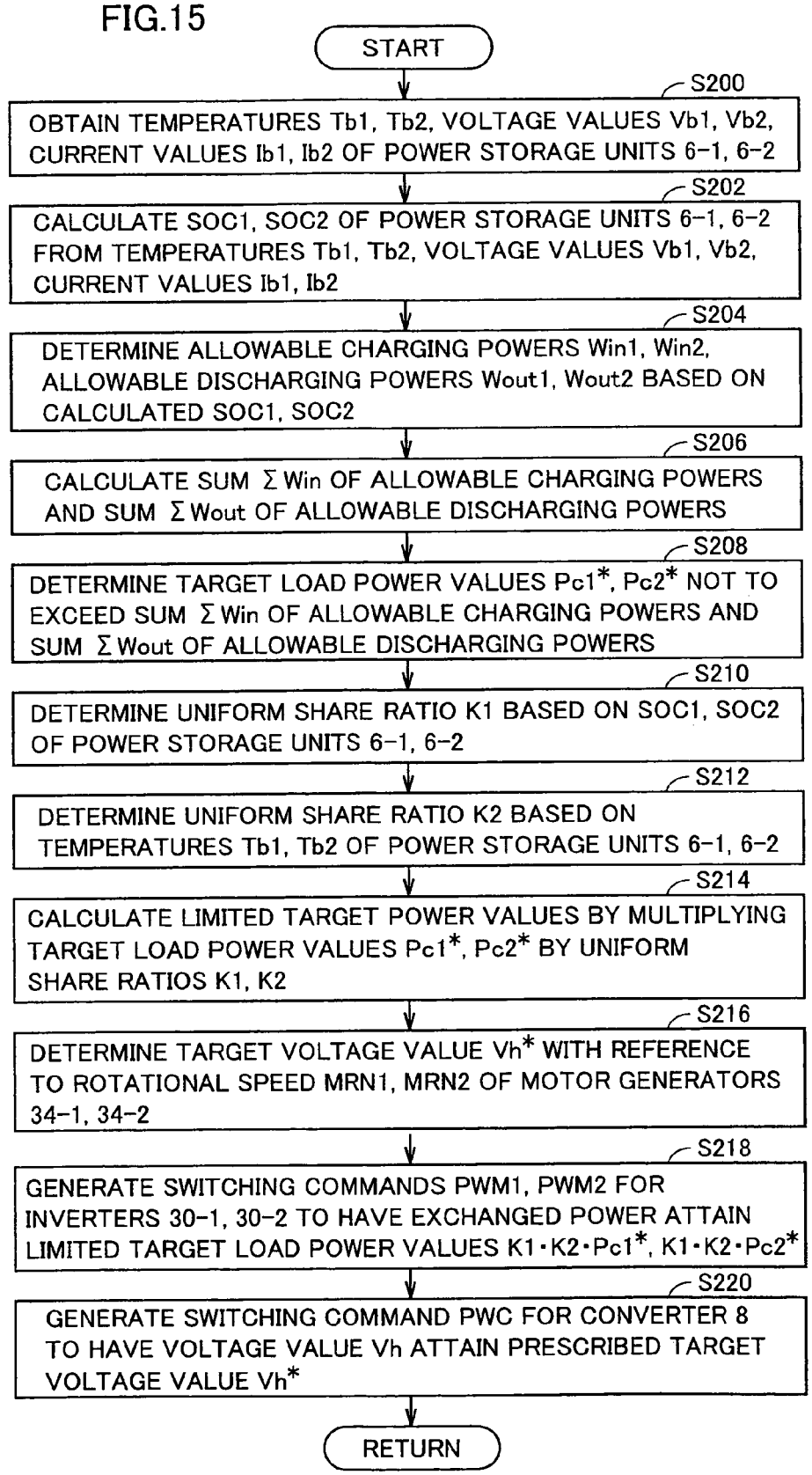
FIG. 15 is a flowchart related to the method of controlling the driving force generation system in accordance with Embodiment 2 of the present invention.

FIG. 15 is a flowchart related to the method of controlling the driving force generation system in accordance with Embodiment 2 of the present invention. The flowchart shown in FIG. 15 can be implemented by HV-ECU 2A and battery ECU 4 executing programs stored in advance.

Referring to FIG. 15, battery ECU 4 obtains temperatures Tb1 and Tb2, voltage values Vb1 and Vb2, and current values Ib1 and Ib2 of power storage units 6-1 and 6-2 (step S200). Battery ECU 4 calculates SOC1 and SOC2 of power storage units 6-1 and 6-2, based on temperatures Tb1 and Tb2, voltage values Vb1 and Vb2, and current values Ib1 and Ib2 (step S202). Further, based on the calculated SOC1 and SOC2, battery ECU 4 determines allowable charging powers Win1 and Win2 and allowable discharging powers Wout1 and Wout2 of power storage units 6-1 and 6-2 (step S204). The calculated SOC1 and SOC2, allowable charging powers Win1 and Win2 and allowable discharging powers Wout1 and Wout2 are transmitted from battery ECU 4 to HV-ECU 2A.

HV-ECU 2A sums up allowable charging powers Win1 and Win2 and allowable discharging powers Wout1 and Wout2, respectively, to calculate the sum ΣWin of allowable charging powers and the sum ΣWout of allowable discharging powers (step S206). Then, HV-ECU 2A determines target load power values Pc1* and Pc2* to be exchanged between main line ML and motor generators 34-1 and 34-2, such that these values do not exceed the sum ΣWin of allowable charging powers and the sum ΣWout of allowable discharging powers (step S208).

Thereafter, HV-ECU 2A determines uniform share ratio K1 based on SOC1 and SOC2 of power storage units 6-1 and 6-2 (step S210). Further, HV-ECU 2A determines the uniform share ratio K2 based on temperatures Tb1 and Tb2 of power storage units 6-1 and 6-2 (step S212). Further, HV-ECU 2A multiplies target load power values Pc1* and Pc2* determined at step S208 by uniform share ratios K1 and K2, and thereby calculates limited target load power values (step S214).

Further, HV-ECU 2A determines target voltage value Vh* by making a reference to rotational speed MRN1 and MRN2 of motor generators 34-1 and 34-2 (step S216).

Then, HV-ECU 2A generates switching commands PWM1 and PWM2 to inverters 30-1 and 30-2, so that the powers exchanged between the main line ML and motor generators 34-1 and 34-2 attain to the limited target load power values K1·K2·Pc1* and K1·K2·Pc2* (step S218). Further, HV-ECU 2A generates switching command PWC to converter 8, so that the voltage value Vh appearing between the main positive line MPL and the main negative line MNL attains to the prescribed target voltage value Vh* (step S220).

The process described above is repeatedly executed as long as vehicle 100 is in the IGON (ignition on) state.

According to Embodiment 2 of the present invention, allowable charging power Win and allowable discharging power Wout of each of the plurality of power storage units are determined in advance, and the sum ΣWin of allowable charging powers and the sum ΣWout of allowable discharging powers, as the sums of allowable charging powers Win and allowable discharging powers Wout, are calculated. The target load power value to be exchanged between the main line and the motor generator is determined within the range of calculated sum ΣWin of allowable charging powers and the sum ΣWout of allowable discharging powers.

Further, using the target load power value limited by the uniform share ratio in accordance with the internal resistance values of the plurality of power storage units, power control of each inverter is executed. The uniform share ratio is determined such that each of the plurality of power storage units does not exceed the corresponding allowable charging power Win and the allowable discharging power Wout and, therefore, even in a structure having a plurality of power storage units connected to a single converter, flow of power exceeding the allowable capacity of power supply or power regeneration of each power storage unit can be prevented.

Therefore, as compared with a structure having a plurality of converters arranged in one-to-one correspondence with the plurality of power storage units, the space and cost can advantageously be reduced and, in addition, power management of the system as a whole for protecting the plurality of power storage units becomes possible.

Though driving force generation systems having two power storage units have been described in Embodiments 1 and 2 above, the system may have a structure with three or more power storage units. Specifically, what is necessary in calculating the sum ΣWin of allowable charging powers and the sum ΣWout of allowable discharging powers is to sum up allowable charging powers Win and allowable discharging powers Wout of all power storage units. Even when converters same in number (three or more) as the power storage units are provided, what is necessary is to have any one of the converters execute the voltage converting operation in accordance with the "voltage control mode" and to have remaining converters execute the voltage converting operation in accordance with the "power control mode."

Further, though a structure of a so-called parallel/serial type hybrid vehicle having two motor generators have been described as an example in Embodiments 1 and 2 above, the present invention is applicable to any structure having a plurality of power storage units, regardless of the number and structure of motor generators (rotating electric machines). Specifically, the present invention is applicable to a parallel type, or serial type hybrid vehicle, having only one motor generator.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A driving force generation system, comprising:
a power line;
a plurality of power storage units connected in parallel with said power line;
a rotating electric machine capable of bi-directionally converting electric power and rotational driving force;
a power converting unit connected between said power line and said rotating electric machine, for performing power conversion between said rotating electric machine and said power line;
allowable power determining means for determining allowable power of charging or discharging in each of said plurality of power storage units, based on state of charge of each of said plurality of power storage units; and
target power value determining means for determining, within a range of a sum of allowable powers obtained by summing up said allowable power of each of said power storage units, a target power value to be exchanged between said power line and said rotating electric machine, in accordance with a state of running; wherein
said power converting unit is configured to execute a power converting operation such that the power exchanged between said power line and said rotating electric machine attains to said target power value.

2. The driving force generation system according to claim 1, further comprising:
- a plurality of voltage converting units each arranged between said power line and corresponding one of said plurality of power storage units; wherein
- any one of said plurality of power converting units executes the voltage converting operation in accordance with a first control mode to have a voltage of said power line attain to a prescribed target voltage value; and
- each of remaining one(s) of said plurality of voltage converting units executes the voltage converting operation in accordance with a second control mode to have a power exchanged between said power line and corresponding said power storage unit attain a corresponding target shared power value.

3. The driving force generation system according to claim 2, further comprising
- distributing means for determining said target shared power value for each of the remaining one(s) of said plurality of power storage units in accordance with said target power value, such that power to be shared by each of said plurality of power storage units does not exceed corresponding said allowable power.

4. The driving force generation system according to claim 1, further comprising:
- a single voltage converting unit arranged between said power line and said plurality of power storage units; wherein
- said target power value determining means determines said target power value such that it does not exceed a value obtained by multiplying said sum of allowable powers by a uniform share ratio in accordance with internal resistance values of said plurality of power storage units.

5. The driving force generation system according to claim 4, wherein
- said uniform share ratio is determined dependent on state of charge of said plurality of power storage units.

6. The driving force generation system according to claim 4, wherein
- said uniform share ratio is determined dependent on temperature of said plurality of power storage units.

7. The driving force generation system according to claim 4, wherein
- said voltage converting unit executes the voltage converting operation in accordance with a control mode to have a voltage of said power line attain a prescribed target voltage value.

8. The driving force generation system according to claim 1, comprising:
- a plurality of said rotational electric machines; and
- a plurality of said power converting units corresponding to said plurality of rotating electric machines, respectively; wherein
- each of said plurality of power converting units executes the power converting operation such that a sum of powers exchanged between said power line and said plurality of rotating electric machines attains to said target power value.

9. A driving force generation system, comprising:
- a power line;
- a plurality of power storage units connected in parallel with said power line;
- a rotating electric machine capable of bi-directionally converting electric power and rotational driving force;
- a power converting unit connected between said power line and said rotating electric machine, for performing power conversion between said rotating electric machine and said power line; and
- a controller; wherein
- said controller is configured to
  - determine allowable power of charging or discharging in each of said plurality of power storage units, based on state of charge of each of said plurality of power storage units, and
  - determine within a range of a sum of allowable powers obtained by summing up said allowable power of each of said power storage units, a target power value to be exchanged between said power line and said rotating electric machine, in accordance with a state of running; and
- said power converting unit is configured to execute a power converting operation such that the power exchanged between said power line and said rotating electric machine attains to said target power value.

10. A driving force generation system, comprising:
- a power line;
- a plurality of power storage units;
- a plurality of voltage converting units connected in parallel with said power line and in correspondence with said plurality of power storage units, respectively;
- a plurality of rotating electric machines capable of bi-directionally converting electric power and rotational driving force;
- a plurality of power converting units connected in parallel with said power line and in correspondence with said plurality of rotating electric machines, respectively; and
- a controller; wherein
- said controller is configured to individually generate a command for each of said plurality of voltage converting units to be within a range of allowable power of charging or discharging that is determined based on state of charge of each of said plurality of power storage units, and to individually generate a command for each of said plurality of power converting units to be within a range of a sum of allowable powers that is obtained by summing up said allowable power of each of said plurality of power storage units.

11. A vehicle provided with a driving force generation system,
- said driving force generation system including
- a power line,
- a plurality of power storage units connected in parallel with said power line,
- a rotating electric machine capable of bi-directionally converting electric power and rotational driving force,
- a power converting unit connected between said power line and said rotating electric machine, for performing power conversion between said rotating electric machine and said power line,
- allowable power determining means for determining allowable power of charging or discharging in each of said plurality of power storage units, based on state of charge of each of said plurality of power storage units, and
- target power value determining means for determining, within a range of a sum of allowable powers obtained by summing up said allowable power of each of said power storage units, a target power value to be exchanged between said power line and said rotating electric machine, in accordance with a state of running; wherein said power converting unit is configured to execute a power converting operation such that the power exchanged between said power line and said rotating electric machine attains to said target power value.

12. A method of controlling a driving force generation system, said driving force generation system including a power line, a plurality of power storage units electrically connected in parallel with said power line, a rotating electric machine capable of bi-directionally converting electric power and rotational driving force, and a power converting unit connected between said power line and said rotating electric machine, for performing power conversion between said rotating electric machine and said power line;

said control method comprising the steps of:

determining allowable power of charging or discharging in each of said plurality of power storage units, based on state of charge of each of said plurality of power storage units;

determining within a range of a sum of allowable powers obtained by summing up said allowable power of each of said power storage units, a target power value to be exchanged between said power line and said rotating electric machine, in accordance with a state of running; and controlling a power converting operation at said power converting unit such that the power exchanged between said power line and said rotating electric machine attains to said target power value.

13. A method of controlling a driving force generation system, said driving force generation system including a power line, a plurality of power storage units, a plurality of voltage converting units connected in parallel with said power line and in correspondence with said plurality of power storage units, respectively, a plurality of rotating electric machines capable of bi-directionally converting electric power and rotational driving force, and a plurality of power converting units connected in parallel with said power line and in correspondence with said plurality of rotating electric machines, respectively;

said control method comprising the steps of:

determining allowable power of charging or discharging in each of said power storage units, based on state of charge of each of said plurality of power storage units;

determining a sum of allowable powers by summing up said allowable power of each of said plurality of power storage units;

individually generating a command for each of said plurality of voltage converting units to be within a range of allowable power of each of the power storage units; and individually generating a command for each of said plurality of power converting units to be within a range of the sum of said allowable powers.

* * * * *